US012786365B2

(12) United States Patent
Kim et al.

(10) Patent No.: US 12,786,365 B2
(45) Date of Patent: Nov. 3, 2026

(54) METHOD FOR CORRECTING IMAGE QUALITY BASED ON PREDICTED ILLUMINANCE OF PROJECTION SURFACE AND PROJECTOR THEREOF

(71) Applicant: Samsung Electronics Co., Ltd., Suwon-si (KR)

(72) Inventors: Jonghwan Kim, Suwon-si (KR); Jongho Kim, Suwon-si (KR); Guiwon Seo, Suwon-si (KR); Younghun Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/261,784

(22) Filed: Jul. 7, 2025

(65) Prior Publication Data

US 2026/0101023 A1 Apr. 9, 2026

Related U.S. Application Data

(63) Continuation of application No. PCT/KR2025/008568, filed on Jun. 20, 2025.

(30) Foreign Application Priority Data

Oct. 8, 2024 (KR) ........................ 10-2024-0136170

(51) Int. Cl.
*H04N 9/31* (2006.01)

(52) U.S. Cl.
CPC ......... *H04N 9/3194* (2013.01); *H04N 9/3182* (2013.01)

(58) Field of Classification Search
CPC ....... H04N 9/31; H04N 9/3182; H04N 9/3194
See application file for complete search history.

(56) References Cited

U.S. PATENT DOCUMENTS 3,541,541 A * 11/1970 Engelbart ........... G06F 3/03543 340/870.07
5,861,881 A * 1/1999 Freeman ................ H04H 20/30 348/E7.071

(Continued)

FOREIGN PATENT DOCUMENTS

JP 2015-089048 5/2015
JP 2017181668 A 10/2017

(Continued)

OTHER PUBLICATIONS

Search Report and Written Opinion dated Sep. 18, 2025 issued in International Patent Application No. PCT/KR2025/008568.

*Primary Examiner* — Michael B. Pierorazio
(74) *Attorney, Agent, or Firm* — Nixon & Vanderhye, P.C.

(57) ABSTRACT

A projector may obtain an input image of a specified section; obtain a sensing image corresponding to the input image for each specified section; determine validity of the input image based on at least one of uniformity of color histograms of frames, uniformity of an average picture level, uniformity of variance of the color histograms, and the variance of the color histograms, respectively corresponding to the input image; based on determining that the input image is valid, predict illuminance of the projection surface based on a relationship between the input image and the sensing image; and correct image quality of the input image based on the predicted illuminance of the projection surface to output the corrected image.

16 Claims, 22 Drawing Sheets

(56) References Cited

U.S. PATENT DOCUMENTS

| | | | | |
|---|---|---|---|---|
| 7,526,362 | B2 * | 4/2009 | Kim | G05D 1/0016 701/28 |
| 7,712,125 | B2 * | 5/2010 | Herigstad | H04N 21/4755 725/38 |
| 8,830,067 | B2 * | 9/2014 | Igaki | G06F 3/017 340/693.11 |
| 8,893,164 | B1 * | 11/2014 | Teller | G06Q 30/0252 725/12 |
| 8,913,194 | B2 | 12/2014 | Kim | |
| 9,936,180 | B2 | 4/2018 | Fujioka | |
| 10,616,541 | B2 * | 4/2020 | Oike | H04N 9/3182 |
| 11,134,230 | B2 * | 9/2021 | Naganuma | G09G 5/10 |
| 11,323,673 | B2 | 5/2022 | Oike | |
| 2002/0085843 | A1 * | 7/2002 | Mann | E03C 1/057 396/374 |
| 2006/0064733 | A1 * | 3/2006 | Norton | H04N 21/42646 725/135 |
| 2006/0256133 | A1 * | 11/2006 | Rosenberg | G06F 3/013 345/619 |
| 2007/0124775 | A1 * | 5/2007 | DaCosta | H04N 21/6582 348/E7.071 |
| 2009/0067847 | A1 * | 3/2009 | Nakamura | G08C 23/04 398/128 |
| 2010/0020752 | A1 * | 1/2010 | Anschutz | H04W 4/023 370/328 |
| 2010/0088735 | A1 * | 4/2010 | Sadja | H04N 21/4722 725/116 |
| 2010/0192173 | A1 * | 7/2010 | Mizuki | H04N 21/4312 725/115 |
| 2011/0072448 | A1 * | 3/2011 | Stiers | H04N 21/44204 725/10 |
| 2011/0239266 | A1 * | 9/2011 | Brooks | H04B 10/85 398/141 |
| 2012/0075168 | A1 * | 3/2012 | Osterhout | G06F 3/017 345/8 |
| 2012/0093481 | A1 * | 4/2012 | McDowell | G11B 27/322 348/143 |
| 2012/0222057 | A1 * | 8/2012 | Sadowsky | H04N 21/4223 725/10 |
| 2012/0222058 | A1 * | 8/2012 | El Kaliouby | H04N 21/251 725/10 |
| 2012/0324491 | A1 * | 12/2012 | Bathiche | H04N 21/42201 725/10 |
| 2012/0324492 | A1 * | 12/2012 | Treadwell, III | H04H 60/45 725/10 |
| 2012/0324493 | A1 * | 12/2012 | Holmdahl | H04N 21/252 725/86 |
| 2012/0324494 | A1 * | 12/2012 | Burger | H04N 21/25891 725/12 |
| 2013/0097643 | A1 * | 4/2013 | Stone | A63F 13/44 725/61 |
| 2015/0052555 | A1 * | 2/2015 | Lian | G06F 3/04842 725/37 |
| 2022/0368872 | A1 * | 11/2022 | Shishido | H04N 9/3194 |
| 2024/0129423 | A1 * | 4/2024 | Nishimori | H04N 9/3194 |
| 2024/0333896 | A1 * | 10/2024 | Tsuji | G06T 7/73 |

FOREIGN PATENT DOCUMENTS

| | | | |
|---|---|---|---|
| JP | 2017200104 | A | 11/2017 |
| JP | 2018-050252 | | 3/2018 |
| JP | 2019168545 | A | 10/2019 |
| JP | 2021101204 | A | 7/2021 |
| KR | 100763239 | B1 | 10/2007 |
| KR | 10-1509247 | | 4/2015 |
| KR | 10-2021-0092012 | | 7/2021 |
| KR | 10-2024-0120604 | | 8/2024 |

* cited by examiner

FIG. 10A

1000

| input image APL | photographed image APL | | | |
|---|---|---|---|---|
| | 0 Lux | 75 Lux | 150 Lux | 250 Lux |
| 0 | 0.08 | 15.93 | 32.06 | 59.26 |
| 16 | 0.08 | 15.95 | 32.07 | 59.31 |
| 32 | 0.1 | 16.55 | 32.6 | 59.72 |
| 48 | 1.87 | 18.94 | 34.72 | 61.39 |
| 64 | 4.37 | 21.91 | 37.65 | 63.58 |
| 80 | 7.42 | 25.26 | 39.93 | 67.77 |
| 96 | 11.24 | 28.62 | 42.96 | 70.86 |
| 112 | 15.84 | 33.3 | 46.61 | 73.21 |
| 128 | 19.87 | 36.65 | 49.96 | 76.16 |
| 144 | 23.7 | 40.92 | 53.78 | 80.32 |
| 160 | 30.34 | 45.55 | 58.7 | 82.86 |
| 176 | 34.76 | 51.53 | 62.07 | 86.07 |
| 192 | 39.07 | 56.07 | 67.9 | 89.59 |
| 208 | 45.17 | 59.56 | 70.7 | 92.33 |
| 224 | 44.9 | 60.23 | 71.83 | 93.17 |
| 240 | 45.84 | 60.2 | 72.15 | 93.13 |
| 255 | 44.24 | 61.06 | 72.58 | 93.51 |

$$Validity[i] = \alpha / Var(Histo[i]) + \beta / FrameDiff[i]$$

$$FrameDiff[i] = \frac{1}{T}\left\{ \sum_{t=0}^{T-1} \sum_{j=1}^{32} (Histo_{t+1}[j] - Histo_{t}[j]) + \sum_{t=0}^{T-1} (APL_{t+1} - APL_{t}) + \sum_{t=1}^{T-1} (Var(Histo_{t+1}) - Var(Histo_{t})) \right\}$$

Example 1 of input image illuminance value map predicted for each area (first update)

Example 2 of input image illuminance value map predicted for each area (second update)

METHOD FOR CORRECTING IMAGE QUALITY BASED ON PREDICTED ILLUMINANCE OF PROJECTION SURFACE AND PROJECTOR THEREOF

CROSS-REFERENCE TO RELATED APPLICATIONS

This application is a continuation of International Application No. PCT/KR2025/008568 designating the United States, and filed on Jun. 20, 2025, in the Korean Intellectual Property Receiving Office and claiming priority to Korean Patent Application No. 10-2024-0136170, filed on Oct. 8, 2024, in the Korean Intellectual Property Office, the disclosures of each of which are incorporated by reference herein in their entireties.

BACKGROUND

Field

The disclosure relates to a projector and a method for correcting image quality based on predicted illuminance of a projection surface.

Description of Related Art

In case where an image is viewed through a projector, visibility may be secured by correcting its brightness, contrast, and chroma of the image according to illuminance of external light. The projector may detect the brightness of the external light with an illuminance sensor and correct the image by determining the optimal brightness and contrast based on the detected brightness of the external light, and may further correct the chroma thereof. This requires the projector to have a built-in illumination sensor, which may degrade the performance of the corrected picture in case where the illumination sensor is inaccurate. Further, illuminance values detected by the illuminance sensor may be different from an illuminance value at the actual projection surface.

SUMMARY

Embodiments of the disclosure provide a projector and a method for correcting image quality based on predicted illuminance of a projection surface. For example, various example embodiments of the disclosure relate to a method and a projector apparatus for predicting illuminance of a projection surface based on an image data relationship analysis between an image (e.g., an image captured by a built-in camera) detected by a sensor of the projector and an input image, and correcting image quality based on the predicted illuminance of the projection surface.

According to an example embodiment, the projector may include: an input/output interface comprising circuitry configured to input and output an image; a projection unit comprising a lamp and configured to project the image onto a projection surface; a sensor configured to detect the image projected onto the projection surface; memory for storing at least one instruction; and at least one processor, comprising processing circuitry, electrically connected to the input/output interface, the projection unit, the sensor, and the memory and individually and/or collectively, configured to execute the at least one instruction and to cause the projector to: obtain an input image of a specified section from the input/output interface; obtain a sensing image corresponding to the input image for each specified section from the sensor; determine validity of the input image based on at least one of uniformity of a color histogram of frames, uniformity of an average picture level, uniformity of variance of the color histogram, and the variance of the color histogram, respectively corresponding to the input image; and based on determining that the input image is valid, predict an illuminance of the projection surface based on a relationship between the input image and the sensing image, correct image quality of the input image based on the predicted illuminance of the projection surface, and output the corrected image via the input/output interface.

According to an example embodiment of the disclosure, a method for correcting image quality based on predicted illuminance of a projection surface may include: obtaining an input image of a specified section; obtaining a sensing image corresponding to the input image for each specified section; determining validity of the input image based on at least one of uniformity of a color histogram of frames, uniformity of an average picture level, uniformity of variance of the color histogram, and the variance of the color histogram, respectively corresponding to the input image; based on determining that the input image is valid, predicting an illuminance of the projection surface based on a relationship between the input image and the sensing image; and correcting image quality of the input image based on the predicted illuminance of the projection surface.

According to an example embodiment of the disclosure, a non-transitory computer-readable recording medium in which a program for performing the above method is recorded may be provided.

According to various example embodiments of the disclosure, the illuminance of the projection surface may be predicted using a camera built in the projector without the need for an illuminance sensor in a viewing environment where a video is being reproduced by the projector.

According to various example embodiments of the disclosure, the accuracy of prediction of projection surface illumination may be improved by determining a validity of the input image and predicting the illuminance of the projection surface if the input image is determined to be valid.

According to various example embodiments of the disclosure, the image quality may be compensated for different lighting conditions in a house based on the predicted illuminance of the projection surface, thereby providing an advantageous effect of improving the visibility of the projector degraded by external light.

Effects that can be obtained from various example embodiments of the disclosure are not limited to those mentioned above, and other effects not mentioned herein may be clearly derived and understood by those having ordinary knowledge in the technical field to which the example embodiments of the disclosure belongs from the following description. In other words, any unintended effects of implementing example embodiments of the disclosure may also be derived by those of ordinary skill in the art from the example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 10A and 10B are diagrams for predicting illuminance of a projection surface using a lookup table according to various embodiments;

DETAILED DESCRIPTION

Figure 1:
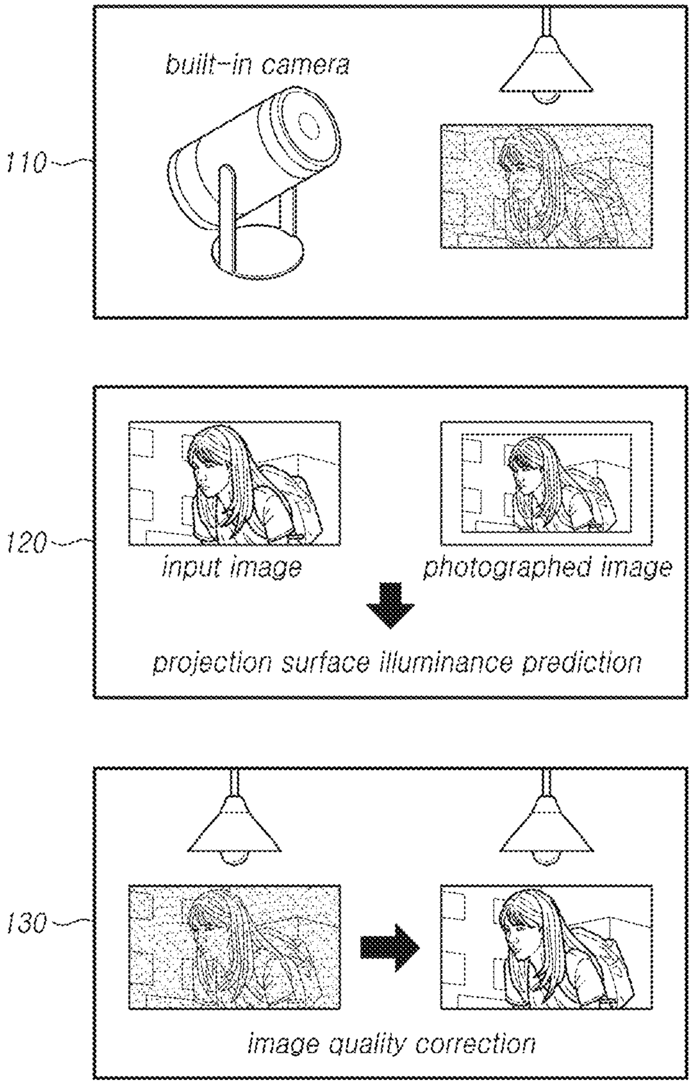
FIG. 1 is a diagram of an example method for correcting image quality based on predicted illuminance of a projection surface according to various embodiments.

Hereinafter, various example embodiments of the disclosure will be described in greater detail with reference to the drawings. However, the disclosure may be implemented in a number of different forms and is not limited to the various example embodiments described herein. With regard to the description of the drawings, the same or similar reference numerals may be used for the same or similar components. Further, in the drawings and their related descriptions, descriptions of well-known functions and configurations may be omitted for clarity and brevity.

FIG. 1 is a diagram illustrating an example method for correcting image quality based on predicted illuminance of a projection surface according to various embodiments.

According to an embodiment, a projector may obtain an input image of a predetermined (e.g., specified) section. The projector may sense an image in reproduction on a projection surface using a sensor. The projector may obtain a sensing image corresponding to the input image for each predetermined section from the sensor. It will be understood by those skilled in the art that the sensor may include a camera, but the disclosure is not limited thereto and may include various measuring devices capable of recognizing an image. Therefore, in this context, the sensing in the disclosure may be used interchangeably with a wording 'photographing'. For example, the projector may photograph (110) an image being reproduced on the projection surface with the camera. The projector may obtain a photographed image corresponding to the input image for the respective predetermined section from the camera.

According to an embodiment, the projector may generate input image data based on the input image and generate sensing image data (or photographed image data) based on the sensing image.

The input image data may include a color histogram and an average picture level (APL) of each frame corresponding to the input image of the predetermined section, but is not limited thereto. The sensing image data may include a color histogram and an average picture level of the frame corresponding to the sensing image sensed at the predetermined section, but are not limited thereto. The average picture level may indicate an average of the sum of brightness of each portion of the image with respect to the brightest color. The color histogram may include a Y(luma) histogram, or may include histograms respectively showing color tone distributions of R(red), G(green), and B(blue).

According to an embodiment, the projector may determine validity of the input image based on the input image data. The projector may determine validity of the input image based on at least one of uniformity of color histograms of frames, uniformity of the average picture level, uniformity of variance of the color histogram, and the variance of the color histogram, corresponding to the input image in the predetermined section. If it is determined that the input image is valid, the projector may predict (120) the illuminance of the projection surface based on analysis of the relationship between the input image data and the sensing image data.

According to an embodiment, the projector may correct (130) the image quality based on the predicted illuminance of projection surface. The projector may correct the image quality by adjusting at least one gain corresponding to contrast, chroma, and sharpness of the input image, based on the predicted illuminance of the projection surface.

Figure 2:
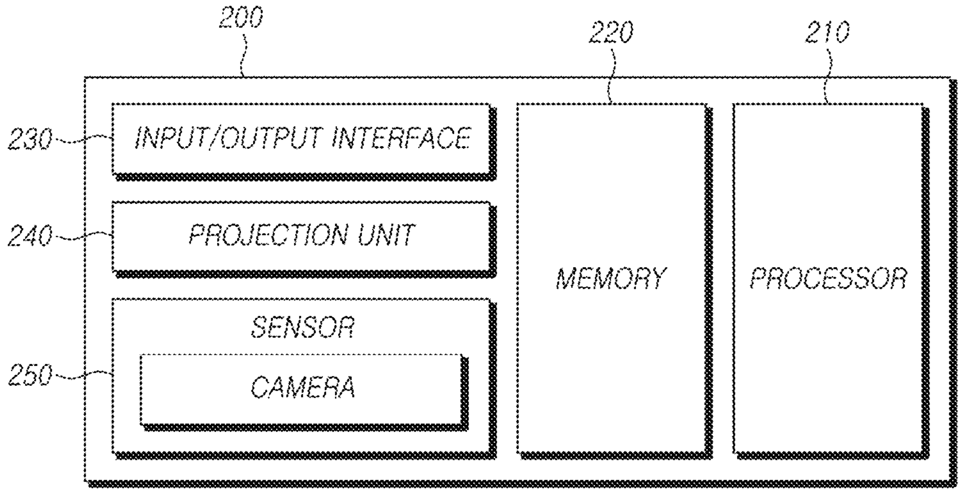
FIG. 2 is a block diagram illustrating an example configuration of a projector according to various embodiments.

FIG. 2 is a block diagram illustrating an example configuration of a projector according to various embodiments.

Referring to FIG. 2, a projector 200 may include a processor (e.g., including processing circuitry) 210, a memory 220, an input/output interface (e.g., including circuitry) 230, a projection unit (e.g., including a lamp/light source and/or a lens) 240, and a sensor 250. The projector 200 may further include at least one of a user interface (not shown), a speaker (not shown), a driving unit (not shown), and a power source (not shown). The projector 200 may include additional components in addition to the illustrated components, or at least one of the illustrated components may be omitted.

The projector 200 may refer to an electronic device that projects (or reflects) an image. For example, the projector 200 may be an optical device that projects an image onto a projection surface (e.g., a screen or a wall surface).

The processor 210 may include various processing circuitry and perform overall control operation of the projector 200. The processor 210 may be included in the projector 200 by being embedded within the projector 200, or may be included by being connected to the projector 200 using the input/output interface 230.

The processor 210 may be implemented as a digital signal processor (DSP), a microprocessor, and/or a time controller (TCON) for processing digital signals. However, the disclosure is not limited thereto, and the processor 210 may include at least one of a central processing unit (CPU), a micro controller unit (MCU), a micro processing unit (MPU), a controller, an application processor (AP), a graphics processing unit (GPU), a communication processor (CP), or an ARM processor, or may be defined as a corresponding term. Further, the processor 210 may be implemented as a system on chip (SoC) with a built-in processing algorithm, a large scale integration (LSI), or a field programmable gate array (FPGA). Furthermore, the processor 210 may execute computer-executable instructions stored in the memory 220 to perform various functions. Thus, each "processor" or "model" herein includes processing circuitry, and/or may include multiple processors. For example, as used herein, including the claims, the term "processor" or "model" may include various processing circuitry, including at least one processor, wherein one or more of at least one processor, individually and/or collectively in a distributed manner, may be configured to perform various functions described herein. As used herein, when "a processor," "at least one processor," "a model," "at least one model," and "one or more processors" are described as being configured to perform numerous functions, these terms cover various situations, for example and without limitation, in which one processor and/or model performs some of recited functions and another processor(s) and/or model(s) performs other of recited functions, and also situations in which a single processor and/or model may perform all recited functions. Additionally, the at least one processor may include a combination of processors performing various of the recited/disclosed functions, e.g., in a distributed manner. At least one processor may execute program instructions to achieve or perform various functions. Likewise, the at least one model may include a combination of circuitry and/or processors performing various of the recited/disclosed functions, e.g., in a distributed manner. At least one processor and/or model may execute program instructions to achieve or perform various functions.

The memory 220 may be implemented as an internal memory such as a read-only memory (ROM) (e.g., electrically erasable programmable read-only memory (EEPROM) or a random access memory (RAM) included in the processor 210, or may be implemented as a separate memory from the processor 210. In this case, the memory 220 may be implemented in the form of a memory embedded in the projector 200 or may be implemented in the form of a memory detachable from the projector 200, depending on a data storage purpose. For example, data for driving the projector 200 may be stored in a memory embedded in the projector 200, and data for the extended function of the projector 200 may be stored in a memory capable of being attached to and detached from the projector 200.

The memory embedded in the projector 200 may be implemented with at least one of a volatile memory (e.g., dynamic RAM (DRAM), static RAM (SRAM), or synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash, NOR flash, etc.)), a hard drive, or a solid state drive (SSD). A memory detachable from the projector 200 may be implemented in the form of a memory card (e.g., compact flash (CF), secure digital (SD), micro-SD (micro-secure digital), mini-SD (mini-secure digital), extreme digital (xD), multi-media card (MMC), etc.), and an external memory (e.g., USB memory) connectable to a USB port.

The input/output interface 230 may include various wired and wireless circuitry and interfaces capable of inputting/outputting images, image information, and/or audio from an external device or to an external device under the control of the processor 210. The input/output interface 230 may include at least one of a wired communication interface, a wireless interface, and a short-range communication interface. It will be understood by those skilled in the art that the input/output interface 230 may be added, deleted, and/or changed according to the performance and structure of the projector 200. The wired communication interface may include at least one interface of high definition multimedia interface (HDMI), mobile high-definition link (MHL), universal serial bus (USB), display port (DP), Thunderbolt, video graphics array (VGA) port, RGB port, D-subministry (D-SUB), and digital visual interface (DVI). The wireless interface may include Wi-Fi, but the disclosure is not limited thereto. The wireless interface may support the wireless LAN standard IEEE 802.11x of the American Institute of Electrical and Electronics (IEEE). The wireless interface may be connected to an Access Point (AP) wirelessly by the control of the processor 210. The short-range communication interface may wirelessly communicate with an external device by the control of the processor 210. The short-range communication may include Bluetooth, Bluetooth low energy, infrared data association (IrDA), ultra-wide band (UWB), WiFi Direct, and/or near field communication (NFC), but the disclosure is not limited thereto. The external device may include an image providing device (e.g., a display device) that provides an image or the like.

The projection unit 240 may include a light source lamp (not shown) and a lens (not shown). The light source lamp may refer to an element that outputs light. Light output from the light source lamp may be projected onto a projection surface through the lens. The projection unit 240 may project an input image input by the input/output interface 230 onto the projection surface. The projection unit 240 may project the input image on the projection surface by zooming in or out the input image.

The sensor 250 may include various sensors including various circuitry and detect an operation state (e.g., power or temperature) or an external environmental state (e.g., a projected image, a user state) of the projector 200 and generate an electrical signal or data value corresponding to the detected state. According to an embodiment, the sensor 250 may detect an image projected onto the projection surface. According to an embodiment, the sensor 250 may include at least one of a camera and a measuring device capable of recognizing an image. The sensor 250 may further include a gesture sensor, a gyro sensor, an acceleration sensor, an atmospheric pressure sensor, a magnetic sensor, a grip sensor, a proximity sensor, a color sensor, an infrared (IR) sensor, a biometric sensor, a temperature sensor, a humidity sensor, an illumination sensor, and a distance sensor. The distance sensor may detect a distance between an external object, a projection surface, or the like, and the projector 200. The distance sensor may include a time of flight (ToF) sensor for measuring a distance using a signal (near-infrared rays, ultrasonic waves, laser, etc.), but the disclosure is not limited thereto. The gyro sensor or the acceleration sensor may detect a direction of the projector 200. The illuminance sensor may detect an illuminance of the external environment of the projector 200.

The camera may photograph a subject to generate a photographed image. The photographed image may include a moving image and a still image. The camera may include a lens and an image sensor. The lens may include a general-purpose lens, a wide-angle lens, and a zoom lens, but is not limited thereto. The lens may be determined depending on the type, characteristics, usage environment, or the like of the projector 200. The image sensor may include a complementary metal oxide semiconductor (CMOS) and a charge-coupled device (CCD), but is not limited thereto. The camera may include a combination of one or more of an infrared sensor, a 3D sensor, and an ultrasonic sensor, but is not limited thereto.

The camera may output incident light as an image signal. Specifically, the camera may include a lens, pixels, and an AD converter. The lens may collect light from a subject to form an optical image on its photographing area, and the pixels may output light transmitted through the lens as an analog image signal. The AD converter may convert an analog image signal into a digital image signal to output the digital image signal. The camera may be arranged to photograph at least one of the front surface, the side surface, and the rear surface of the projector 200. The camera may be a single camera or a plurality of cameras. By photographing with a plurality of cameras, its three-dimensional movement may be analyzed more precisely.

According to an embodiment, the camera may generate a photographed image by photographing an image projected on the projection surface by the projection unit 240.

The user interface (not shown) may include at least one of a button, a touch pad, a mouse, a keyboard, and a touch screen. The button may have various types of buttons such as a mechanical button, a touch pad, a wheel, or the like that are arranged in a certain area such as a front portion, a side portion, and a rear portion of an exterior of a main body of the projector 200.

The speaker (not shown) may output various notification sounds, voice messages or the like as well as various audio data input through the input/output interface 230.

The driving unit (not shown) may include various driving circuitry and/or a motor and control the direction and angle of the projector 200 or may control the movement of the main body of the projector 200.

The power source (not shown) may include a power supply and supply power to at least one component of the projector 200. The power source may include at least one of a rechargeable battery and a power cable capable of receiving an external power source. For example, in case where the power source includes both the battery and the power cable, the power cable may be plugged-in for power where an outlet is available, and the power source may be powered by the built-in battery where an outlet is not available.

According to an embodiment, the processor 210 may be electrically connected to the input/output interface 230, the projection unit 240, the sensor 250, and the memory 220.

According to an embodiment, the processor 210 may obtain an input image of a predetermined section from the input/output interface 230. The processor 210 may obtain a sensing image corresponding to the input image for the predetermined (e.g., specified) section from the sensor 250. For example, the processor 210 may obtain a photographed image corresponding to the input image for each predetermined section from the camera. The input image acquisition section and the camera photographing period will be described in greater detail below with reference to FIGS. 4 and 5.

According to an embodiment, the processor 210 may crop an image area from the sensing image. The processor 210 may warp the cropped sensing image based on an aspect ratio of the input image. The term 'warping' may refer to a geometric processing technique of moving a position of an image pixel. The warping technique may obtain a desired correction effect by calculating a position of a corresponding pixel using a featuring point and a control line. The processor 210 may obtain the sensing image corresponding to the aspect ratio of the input image by warping the cropped sensing image. An example of cropping and warping the photographed image and correcting the same will be described in greater detail below with reference to FIG. 6.

According to an embodiment, the processor 210 may calculate input image data based on the input image. The processor 210 may calculate sensing image data based on the sensing image. The processor 210 may calculate the sensing image data based on the warped sensing image. The input image data may include a color histogram and an average picture level (APL) of each of frames corresponding to the input image in the predetermined section. The sensing image data may include a color histogram and an average picture level of a frame corresponding to the sensing image sensed for the respective predetermined section.

According to an embodiment, the processor 210 may determine the validity of the input image based on the input image data. The processor 210 may determine the validity of the input image based on at least one of the uniformity of the color histogram of frames, the uniformity of the average picture level, the uniformity of the variance of the color histogram, and the variance of the color histogram, respectively corresponding to the input image. A method of calculating a validity value for determining validity will be described in greater detail below with reference to Equation 1 below. Examples of input images for which the validity is determined will be described in greater detail below with reference to FIGS. 7 and 8.

According to an embodiment, if it is determined that the input image is valid, the processor 210 may predict the illuminance of the projection surface by analyzing the relationship between the input image data and the sensing image data, using a learning model or a lookup table. The processor 210 may generate the learning model by performing an artificial intelligence learning on a relationship between a pair of the input image data and the sensing image data and the projection surface illuminance. The processor 210 may generate the relationship between the pair of the input image data and the sensing image data and the projection surface illuminance as a lookup table. An example of predicting the illuminance of the projection surface using a learning model will be described in greater detail below with reference to FIG. 9. An example of predicting the illuminance of the projection surface using the lookup table will be described in greater detail below with reference to FIGS. 10A and 10B.

According to an embodiment, if it is determined that the input image is not valid, the processor 210 may obtain a second input image of a second predetermined section from the input/output interface 230, and may obtain a second sensing image corresponding to the second input image for the second predetermined section from the sensor 250. The processor 210 may calculate second input image data based on the second input image. The processor 210 may calculate second sensing image data based on the second sensing image. The processor 210 may determine validity of the second input image based on the second input image data. For example, the processor 210 may determine the validity of the input image again based on the input image obtained in a new section.

According to an embodiment, the processor 210 may correct an image quality based on an illuminance of the predicted projection surface. An example of comparing before and after image quality correction will be described in greater detail below with reference to FIG. 11. An example of setting an intensity of the image quality correction based on the predicted illuminance of the projection surface will be described in greater detail below with reference to FIGS. 12A and 12B.

According to an embodiment, after correcting the image quality, the processor 210 may increase the predetermined section by a predetermined value. The processor 210 may maintain the increased predetermined section until the predicted illuminance of the projection surface is not changed. By increasing the predetermined section, the processor 210 may increase the period of image sensing and illuminance prediction based thereon, thereby reducing its processing overhead. An example of increasing a photographing period of the camera after the image quality correction will be described in greater detail below with reference to FIG. 5.

According to an embodiment, the processor 210 may predict the illuminance for each projection surface area and correct the image quality for each area. To this end, the processor 210 may divide each of frames corresponding to the input image of the predetermined section into a predetermined number of areas. The processor 210 may divide a frame corresponding to the sensing image sensed for each predetermined section into the predetermined number of areas. The processor 210 may calculate third input image data for the each area. The processor 210 may calculate third sensing image data for the each area. The processor 210 may determine the validity for each area of the input image based on the third input image data. If it is determined that the area of the input image is valid, the processor 210 may predict the illuminance of the projection surface area corresponding to the area, using the learning model or the lookup table. The processor 210 may correct the image quality for each area based on the predicted illuminance of the projection surface area. An example of the illuminance prediction and the image quality correction for each projection surface area will be described in greater detail below with reference to FIGS. 14, 15, 16, 17A, 17B and 17C.

Figure 3:
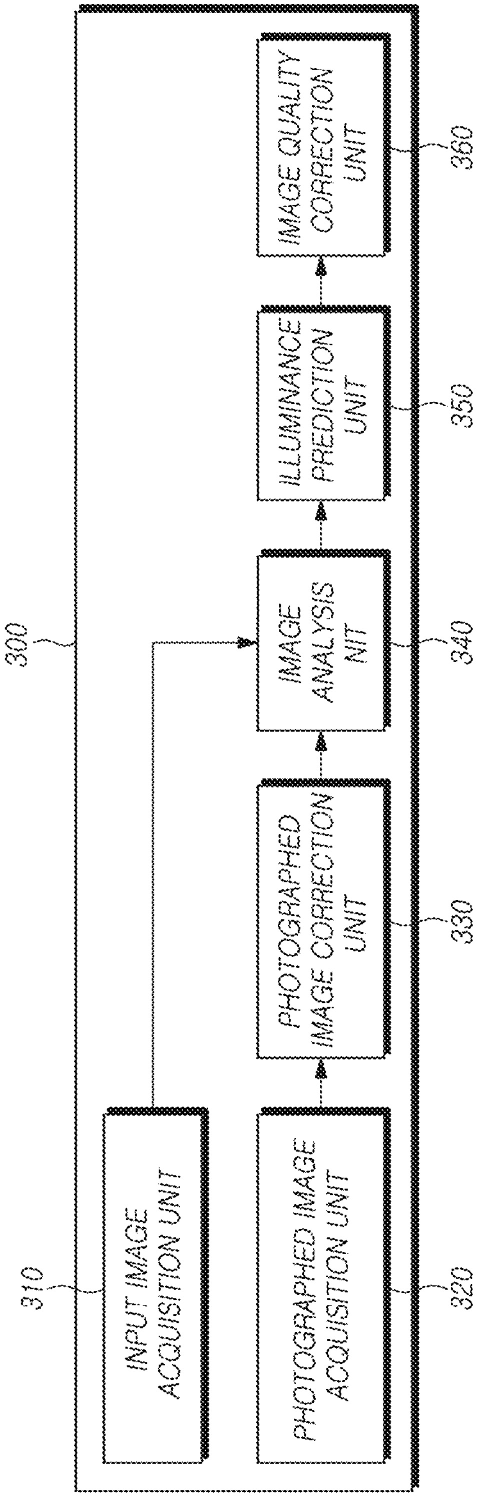
FIG. 3 is a block diagram illustrating an example configuration of software of a projector according to various embodiments.

FIG. 3 is a block diagram illustrating example software of a projector according to various embodiments.

A projector 300 of FIG. 3 may be an electronic device corresponding to the projector 200 of FIG. 2. The projector 300 may include an input image acquisition unit 310, a photographed image acquisition unit 320, a photographed image correction unit 330, an image analysis unit 340, an illuminance prediction unit 350, and an image quality correction unit 360, each of which may include various processing circuitry and/or executable program instructions. At least one processor of the projector 300 may be configured to execute the input image acquisition unit 310, the photographed image correction unit 320, the photographed image correction unit 330, the image analysis unit 340, the illuminance prediction unit 350, and the image quality correction unit 360. The projector 300 may further include at least one additional component in addition to the illustrated components, or may omit at least one of the illustrated components.

According to an embodiment, the input image acquisition unit 310 may obtain an input image of a predetermined (e.g., specified) section from the input/output interface 230 and store the same in the memory 220. The input image acquisition unit 310 may obtain frames corresponding to the input image of the predetermined section and store the same in the memory 220. Each frame may include at least one pixel that is a minimum unit of an image. The predetermined section may refer to an input image acquisition section.

According to an embodiment, the photographed image acquisition unit 320 may obtain a photographed image corresponding to the input image from the camera for each predetermined section, and store the photographed image in the memory 220. The camera may photograph the input image being reproduced in real time on a projection surface. The predetermined section may refer to a camera photographing period.

The predetermined (e.g., specified) section may be set based on a delay required for the camera to capture the input image and process the photographed image. The predetermined section may be set in advance based on an external input (e.g., a user input), but the disclosure is not limited thereto. The predetermined section may be set based on the specifications of the projector 200 and the camera, but the disclosure is not limited thereto.

Figure 4:
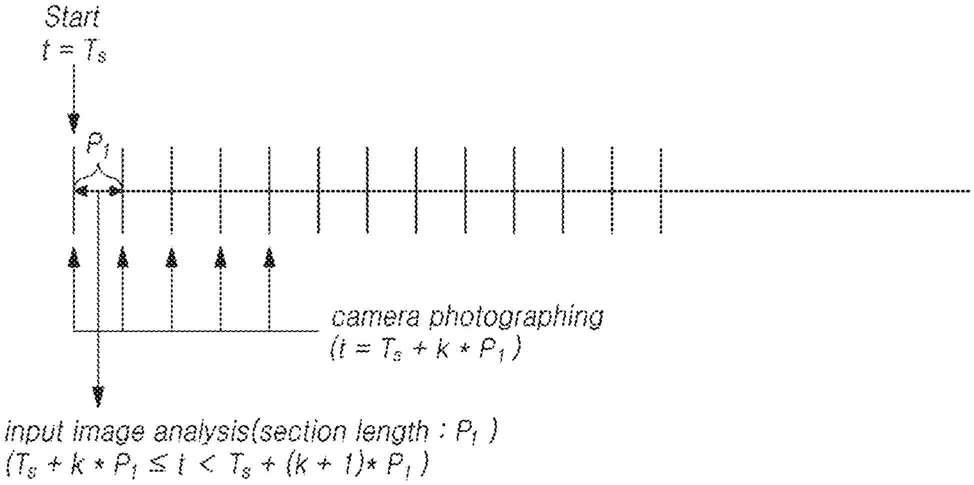
FIG. 4 is a timing diagram illustrating an input image acquisition section and a camera photographing period according to various embodiments.

FIG. 4 is a timing diagram illustrating the predetermined section according to various embodiments.

Referring to FIG. 4, $T_s$ may indicate a start time point of input image acquisition. The input image acquisition unit 310 may obtain input image frames in a section $P_1$ from the input/output interface 230. In the example illustrated, the input image acquisition unit 310 may obtain the input image frames in the section from a time point $T_s+k*P_1$ to less than a time point $T_s+(k+1)*P_1$, wherein k is an integer starting from 0 and increasing by 1. The photographed image acquisition unit 320 may obtain a photographed image by photographing the input image being reproduced on the projection surface with a period $P_1$.

According to an embodiment, the number of times of photographing and the number of times of image analysis based thereon may be reduced by increasing the predetermined section by a predetermined value after predicting an illuminance surface based on the relationship analysis between the input image and the photographed image, and correcting the image quality.

Figure 5:
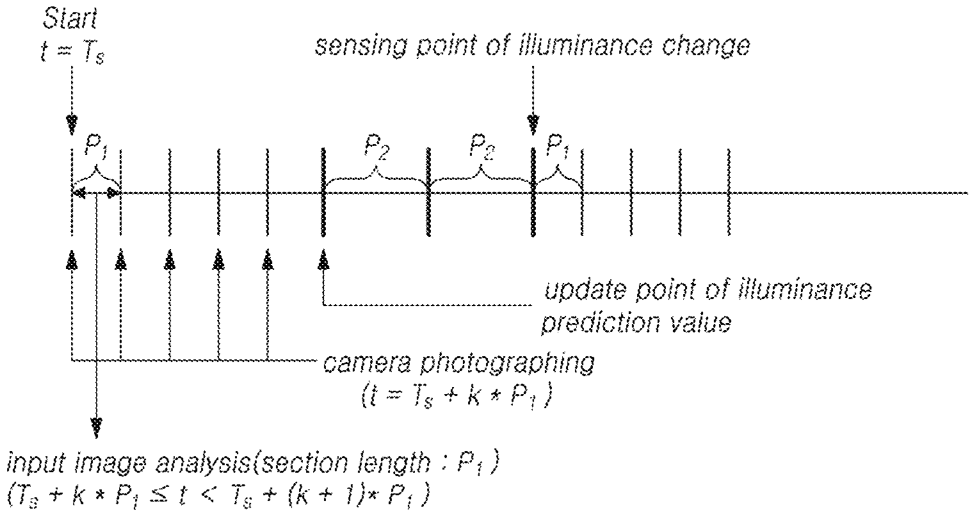
FIG. 5 is a timing diagram illustrating an example of increasing a camera photographing period after image quality correction according to various embodiments.

FIG. 5 is a timing diagram illustrating an example of increasing the predetermined section after the image quality correction according to various embodiments.

Referring to FIG. 5, the projectors 200 and 300 may obtain an input image for each $P_1$ section, and obtain photographed images with a period $P_1$. In case where the projectors 200 and 300 determine that the input image is valid only after a fifth $P_1$ section, they may predict the illuminance of the projection surface and correct the image quality at the corresponding time point. After correcting the image quality, the projectors 200 and 300 may obtain the input image for each section $P_2$ in which the section $P_1$ is increased by a predetermined value, and obtain the photographed image with a period $P_2$. The section $P_2$ may be maintained until the predicted value of the projection surface illuminance is not changed. The projectors 200 and 300 may determine (or detect) whether the predicted value of the projection surface illuminance is changed through an operation of comparing the average picture level of the input image with the average picture level of the photographed image. It will be understood by those skilled in the art that a method of determining whether a predicted value of the projection surface illuminance is changed is not limited thereto. Referring to FIG. 5, by increasing the section $P_1$ to the section $P_2$ after performing the image quality correction, the projectors 200 and 300 may reduce the number of times of photographing and the number of times of image analysis based thereon, thus reducing the processing overhead. Referring to FIG. 5, if it is determined that the predicted value of the projection surface illumination has changed, the projectors 200 and 300 may again obtain the input image for each $P_1$ section and obtain the photographed image for each $P_1$ period, whereby the processing overhead may be increased, but the illuminance prediction may be performed more precisely.

According to an embodiment referring again to FIG. 3, the photographed image correction unit 330 may correct the photographed image in order to accurately compare and analyze the photographed image data with the input image data.

Figure 6:
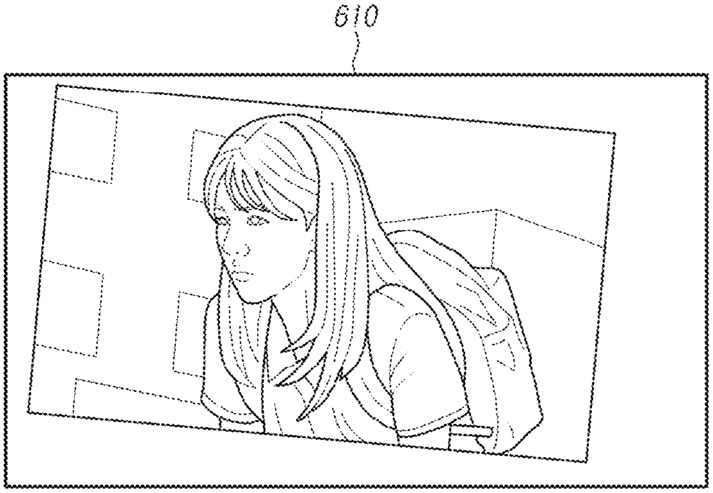
FIG. 6 is a diagram illustrating an example of cropping and warping a photographed image to correct the same according to various embodiments.
Figure 6:
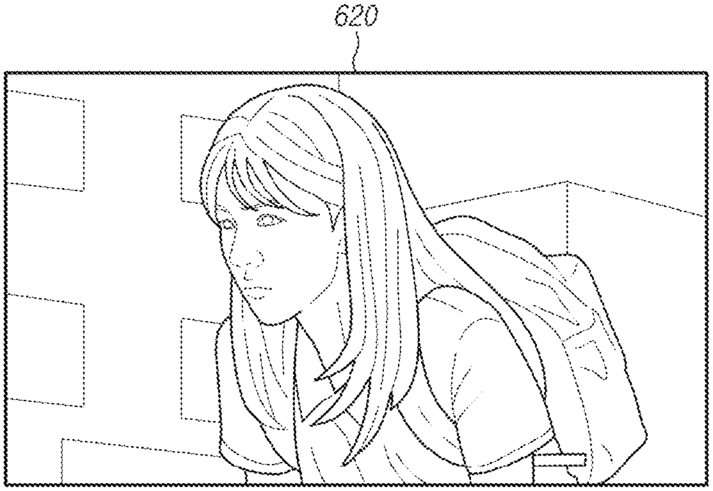

Referring now to FIG. 6, in a case of photographing a projection surface by a camera, a peripheral area such as a wall or a screen may be captured (610) together in addition to the projected image. in case where the photographed image including the peripheral area is compared with the input image and analyzed, an inaccurate result may be obtained. As such, the photographed image correction unit 330 may crop the image area actually projected from the photographed image. The photographed image correction unit 330 may detect four corners of the image, using a corner detection technology. The corner detection technology may include Harris Corner detector technology, but the disclosure is not limited thereto. According to an embodiment, the photographed image correction unit 330 may detect a position of the image, using an edge detection technology. The edge detection technology may include Canny edge detector technology, but the disclosure is not limited thereto.

According to an embodiment, the photographed image correction unit 330 may warp the cropped photographed image based on an aspect ratio of the input image. The photographed image correction unit 330 may obtain a photographed image corresponding to the aspect ratio of the input image, by warping the cropped photographed image. The warping technique may adjust the coordinates of the four corners of the image detected using the corner detection technique, so as to match the horizontal and vertical aspect ratio of the input image. FIG. 6 illustrates an example 620 corrected by cropping and warping the photographed image according to an embodiment of the disclosure.

According to an embodiment referring to FIG. 3 again, the image analysis unit 340 may calculate input image data based on the input image. The image analysis unit 340 may calculate photographed image data based on the photographed image. The image analysis unit 340 may calculate the photographed image data based on the warped photographed image. The input image data may include a color histogram ($Histo_{in}$[32]) and an average picture level ($APL_{in}$) of each of frames corresponding to the input image of the predetermined section. The photographed image data may include a color histogram ($Histo_{cam}$ [32]) and an average picture level ($APL_{cam}$) of the frame corresponding to the photographed image photographed for each predetermined section. The average picture level may refer to an average of the sum of brightness of each portion of the image with respect to the brightest color. The color histogram may include a Y(luma) histogram, or may include histograms respectively showing color tone distribution of R(red), G(green), and B(blue). According to an embodiment, the color histogram may include a value sampled by a predetermined number of histogram bins. For example, in case where there are 32 histogram bins, the color histogram may be represented by the Histo[32] data structure for each color tone of Y, R, G, and B.

According to an embodiment, the image analysis unit 340 may determine validity of the input image based on the input image data. The image analysis unit 340 may determine the validity of the input image, based on at least one of uniformity of a color histogram of frames corresponding to the input image, uniformity of an average picture level, uniformity of variance of the color histogram, and the variance of the color histogram.

According to an embodiment, the image analysis unit 340 may obtain a validity value for determining the validity of the input image, through Equations 1 and 2, but it will be understood by those skilled in the art that the disclosure is not limited thereto. The Equations 1 and 2 are example equations for calculating a validity value for an input image, in case where the histogram bins are sampled into 32 levels for T frames of a predetermined section. According to an embodiment, the image analysis unit 340 may determine that the input image of the predetermined section is valid for predicting the illuminance if the validity value is greater than or equal to the predetermined value, and may determine that the input image of the predetermined section is not valid for predicting the illuminance if the validity value is less than the predetermined value.

$$FrameDiff = \frac{1}{T}\left\{\begin{array}{l} \sum_{t=0}^{T-1}\sum_{j=1}^{32}(Histo_{t+1}[j] - Histo_t[j]) + \\ \sum_{t=0}^{T-1}(APL_{t+1} - APL_t) + \\ \sum_{t=0}^{T-1}(\mathrm{Var}(Histo_{t+1}) - \mathrm{Var}(Histo_t)) \end{array}\right\} \quad \text{<Equation 1>}$$

$$\mathrm{Validity} = \alpha/\mathrm{Var}(Histo_{in}) + \beta/FrameDiff \quad \text{<Equation 2>}$$

In Equation 2, α and β may refer to a coefficient that may be set by an external input (e.g., a user input).

Referring to the Equation 1, the term 'FrameDiff' may indicate an average value of the uniformity of the color histogram, the uniformity of the average picture level, and the uniformity of the variance of the color histogram, in between T frames corresponding to an input image of a predetermined section (e.g., a section $P_1$). in case where the color histogram includes a Y(luma) histogram, the uniformity of the color histogram and the uniformity of the variance of the color histogram may be values based on the Y histogram. In case where the color histogram includes all the histograms each representing the color tone distribution map of R(red), G(green), and B(blue), the uniformity of the color histogram and the uniformity of the variance of the color histogram may be values based on all of the R histogram, G histogram, and B histogram.

Referring to the Equations 1 and 2 above, in between the T frames, the smaller the average value of uniformity of the color histogram, the average value of uniformity of the average picture level, and the average value of uniformity of the variance of the color histogram, the greater the validity value. For example, the smaller the FrameDiff value, the greater the validity value.

Referring to the Equations 1 and 2 above, the more monotonous the input image data (e.g., the less the variance), the greater the effectiveness value. For example, the less the variance ($Var(Histo_{in})$) of the color histograms of the T frames, the greater the effectiveness value.

Figure 7:
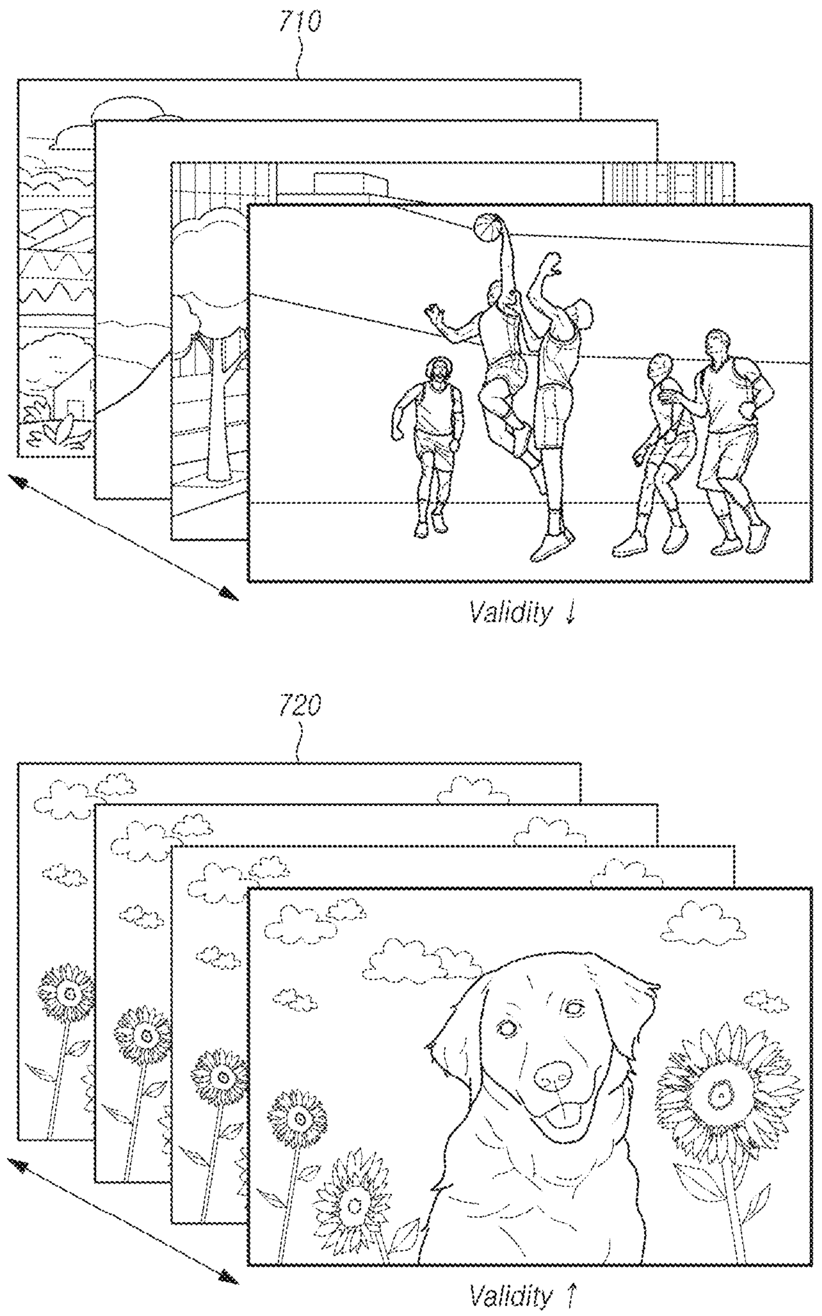
FIG. 7 is a diagram illustrating a first example of determining validity of an input image according to various embodiments.
Figure 8:
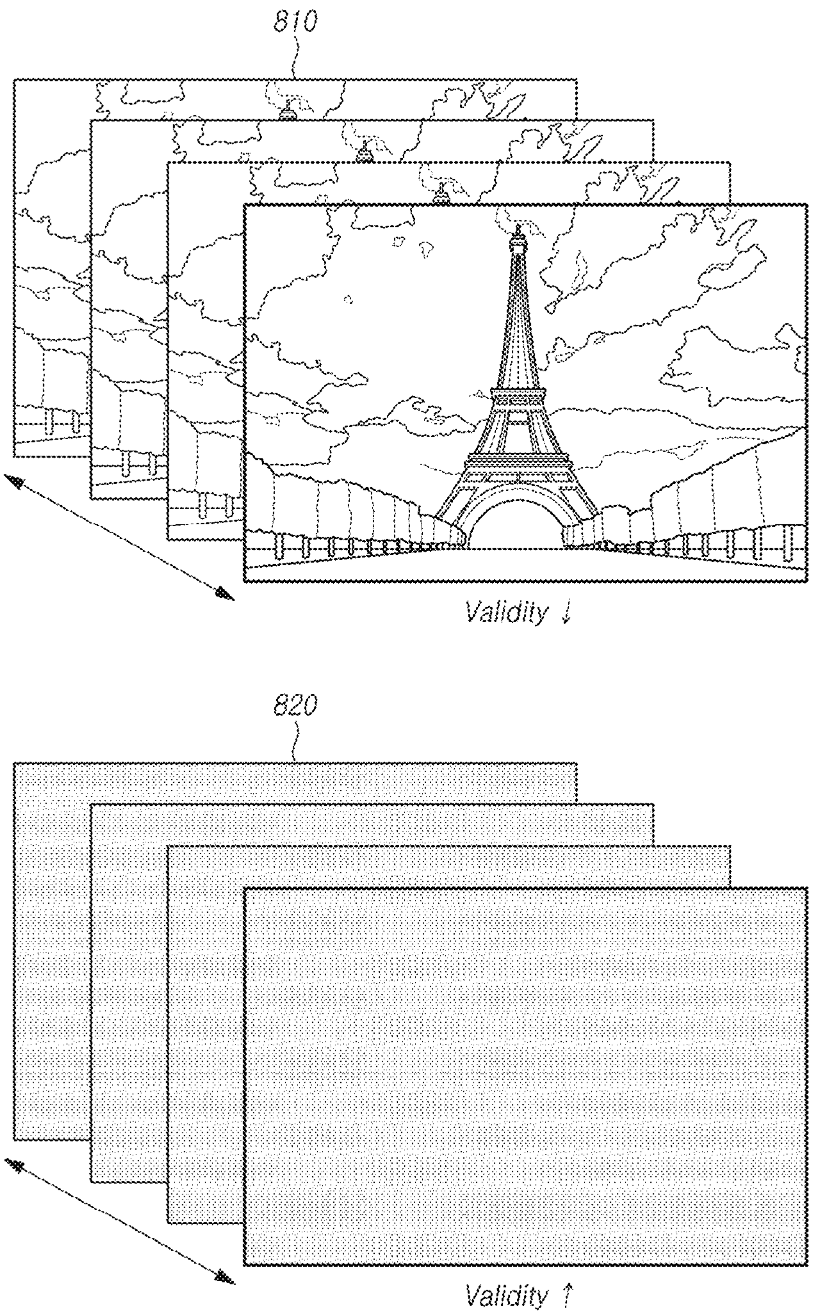
FIG. 8 is a diagram illustrating a second example of determining validity of an input image according to various embodiments.

FIGS. 7 and 8 are diagrams illustrating examples of determining validity of an input image according to various embodiments.

The upper input image 710 and the lower input image 720 of FIG. 7 respectively show that the greater the frameDiff value of the T frames in a predetermined section (e.g., the section $P_1$), the smaller the validity value, and the less the frameDiff value, the greater the validity value.

The upper input image 810 and the lower input image 820 of FIG. 8 show that the greater the variance ($Var(Histo_{in})$) of the color histograms of the T frames in a predetermined section, the smaller the variance, and the smaller the variance ($Var(Histo_{in})$) of the color histogram, the greater the validity value.

According to an embodiment referring to FIG. 3 again, if it is determined that the input image is valid, the illuminance prediction unit 350 may predict the illuminance of the projection surface by analyzing a relationship between the input image data and the photographed image data using a learning model or a lookup table. According to an embodiment, if it is determined that the input image is valid, the illuminance of the projection surface may be predicted to improve the accuracy of the projection surface illuminance prediction. According to an embodiment, the illuminance prediction unit 350 may generate the learning model by performing artificial intelligence learning on a relationship between a pair of the input image data and the photographed image data and the projection surface illuminance. The illuminance prediction unit 350 may generate a relationship between the pair of the input image data and the photographed image data and the projection surface illuminance as the lookup table.

Figure 9:
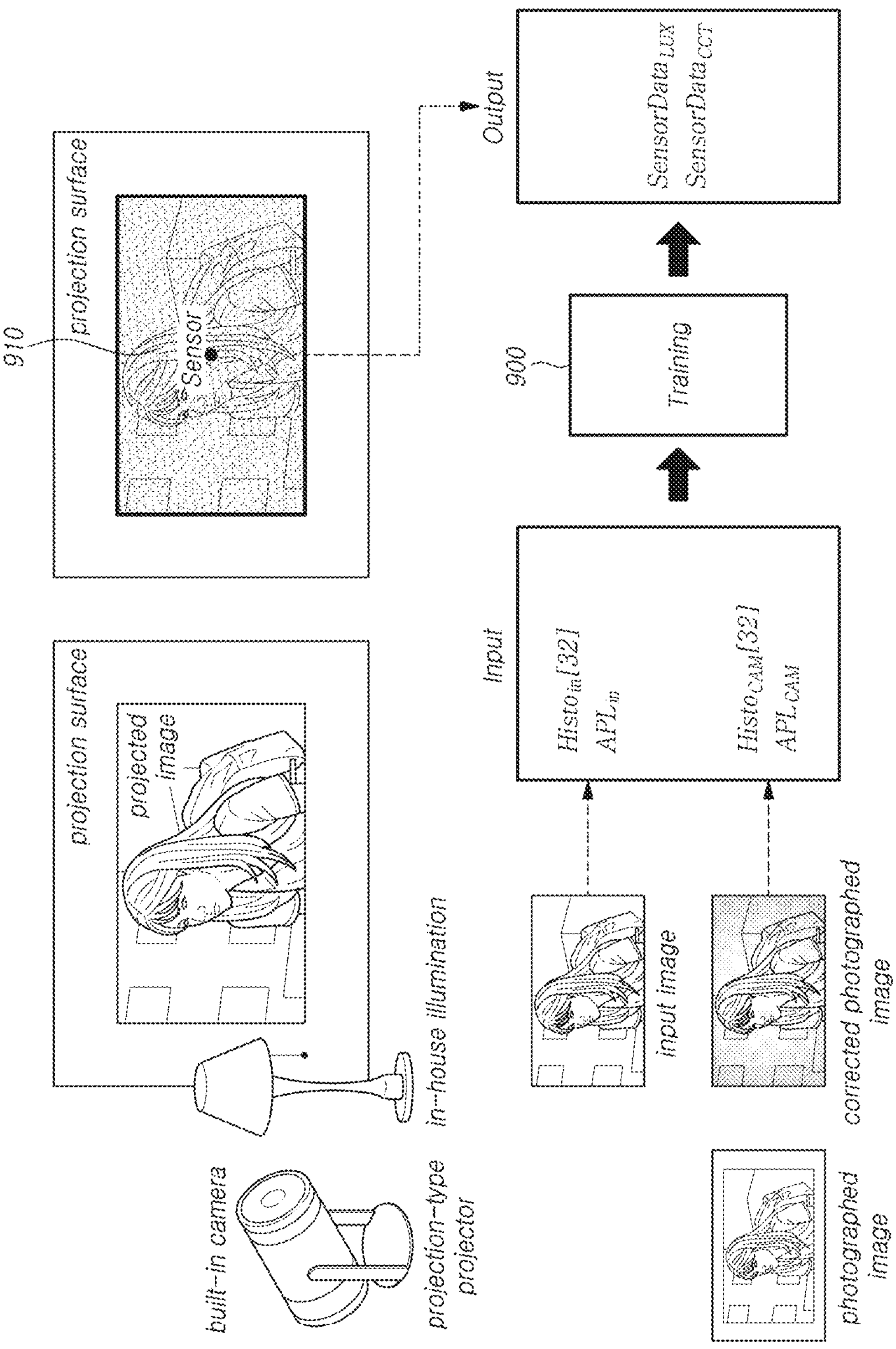
FIG. 9 is a diagram illustrating an example of predicting illuminance of a projection surface using a learning model according to various embodiments.

FIG. 9 is a diagram illustrating an example of predicting illuminance of a projection surface using a learning model according to various embodiments.

Referring to FIG. 9, a learning model 900 may learn the relationship between a pair of the input image data ($Histo_{in}$, $APL_{in}$) and the photographed image data ($Histo_{cam}$, $APL_{cam}$) and the projection surface illuminance. The illuminance of the projection surface may include an illuminance value according to a change in illuminance, which is obtained by an illuminance sensor 910 attached to the center of the projection surface. The illuminance value may include LUX and correlated color temperature (CCT), but the disclosure is not limited thereto. The LUX ($SensorData_{LUX}$ in the illustrated example) may indicate an illuminance of light. The correlated color temperature ($SensorData_{CCT}$ in the illustrated example) may indicate a luminance ratio of RGB in light. The pair of the input image data and the photographed image data, as an input for the learning model 900, and the projection surface illuminance value, as an output for the learning model 900, may be collected and trained in advance. In the process of collecting training data for the learning model 900, various training data may be collected by changing the type, intensity, and position of the lighting.

According to an embodiment, the learning model 900 may be generated through machine learning. The machine learning may be performed in the projector 200 itself or by an external device (e.g., a server). The machine learning may be also performed by an auxiliary processor (e.g., a neural network processing device) inside the projector 200. The auxiliary processor may include a hardware structure specialized for processing an artificial intelligence learning model. The machine learning may include, although not limited to, supervised learning, unsupervised learning, semi-supervised learning, and reinforcement learning. The learning model 900 may include a plurality of artificial neural network layers. The artificial neural network may include, for example, and without limitation, at least one of a deep neural network (DNN), a convolutional neural network (CNN), a recurrent natural network (RNN), a multi-layer perceptron (MLP), a restricted Boltzmann machine (RBM), a deep belief network (DBN), a bidirectional recurrent neural network (BRDNN), and deep Q-networks, but the disclosure is not limited thereto. In addition to the hardware structure, the learning model 900 may additionally or alternatively include a software structure.

According to an embodiment, the illuminance prediction unit 350 may input a pair of input image data and photographed image data to the learning model 900 and obtain an illuminance value of its projection surface as an output.

Figure 10B:
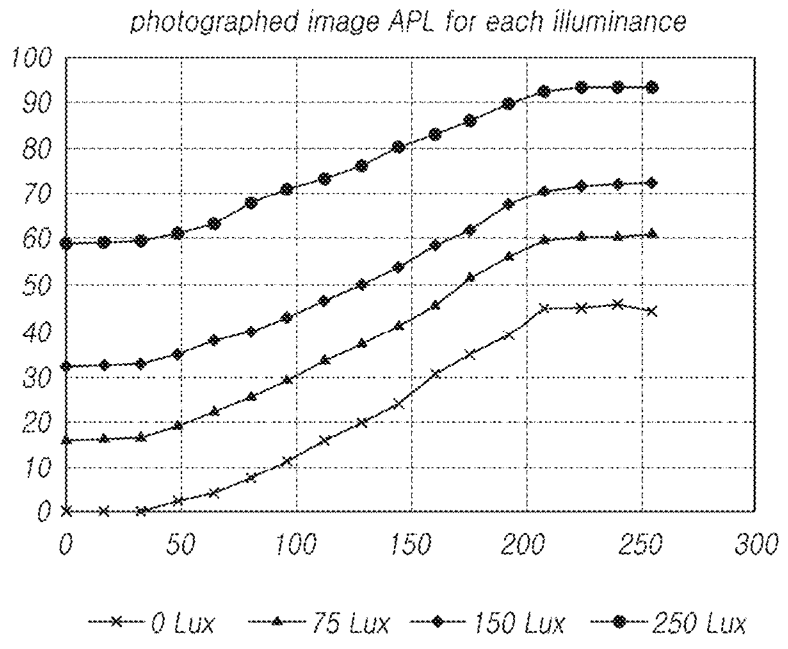

FIGS. 10A and 10B are diagrams illustrating examples of predicting an illuminance of a projection surface using a lookup table according to various embodiments.

Referring to FIGS. 10A and 10B, the illuminance prediction unit 350 may generate a relationship between a pair of the average picture level $APL_{in}$ of the input image and the average picture level $APL_{cam}$ of the photographed image and the projection surface illuminance, as the lookup table 1000 in advance. The illuminance prediction unit 350 may generate a relationship of the pair of the average picture level of the input image and the average picture level of the photographed image with respect to a plurality of illuminance, as the lookup table 1000 in advance. In the illustrated example, the pair of the average picture level of the input image and the average picture level of the photographed image is modeled as the lookup table 1000, but it will be understood by those skilled in the art that the lookup table 1000 may be modeled based on various data including a color histogram.

Referring to FIGS. 10A and 10B, for various illuminance environments (e.g., Lux 0, Lux 75, Lux 150, Lux 250), the lookup table 1000 may be modeled by changing the average picture level APL of the input image of the monochrome pattern (e.g., Gray pattern) and obtaining the average picture level APL of the photographed image corresponding thereto. Referring to the illustrated lookup table 1000, it may be seen that the higher the illuminance of the projection surface, the higher the average picture level APL of the photographed image.

According to an embodiment, the illuminance prediction unit 350 may input a pair of the average picture level of the input image and the average picture level of the photographed image to the lookup table 1000, and may obtain an illuminance value (e.g., Lux) of the projection surface as an output. Referring to FIGS. 10A and 10B, it may be seen that code values of the average picture level of the photographed image corresponding to a specific code value, such as a code value of 32 or less or a code value of 224 or more, among the average picture levels of the input image, have no difference therebetween and thus have no distinction. Accordingly, the illuminance prediction unit 350 may remove code values having no distinction from among the code values of the average picture level of the photographed image and input the code values to the lookup table 1000.

According to an embodiment referring to FIG. 3 again, if it is determined that the input image is not valid, the following operations may be performed by each of the input image acquisition unit 310, the photographed image acquisition unit 320, the photographed image correction unit 330, and the image analysis unit 340. The input image acquisition unit 310 may obtain a second input image of a second predetermined section from the input/output interface 230. The photographed image acquisition unit 320 may obtain a second photographed image corresponding to the second input image from the camera for each second predetermined section. The photographed image correction unit 330 may crop an image area being actually projected from the second photographed image, and warp the cropped second photographed image based on an aspect ratio of the second input image. The image analysis unit 340 may calculate second input image data based on the second input image. The image analysis unit 340 may calculate second photographed image data based on the second photographed image or the cropped second photographed image. The image analysis unit 340 may determine validity of the second input image based on the second input image data. For example, the processor 210 may determine validity of the input image again based on the input image obtained in a new section.

According to an embodiment referring to FIG. 3 again, the image quality correction unit 360 may correct an image quality based on the predicted illuminance of the projection surface. The image quality correction unit 360 may correct the image quality by adjusting at least one gain corresponding to contrast, chroma, and sharpness of the input image based on the predicted illuminance of the projection surface.

Figure 11:
FIG. 11 is a diagram comparing before and after an image quality correction according to various embodiments.

FIG. 11 is a diagram comparing before and after image quality correction according to various embodiments.

Referring to FIG. 11, the upper image 1110, projected in a dark-room environment, has higher contrast, chroma, and sharpness compared to the center image 1120, projected in a bright-room environment, and thus has higher visibility. The image quality correction unit 360 may apply at least one gain corresponding to the contrast, chroma, and sharpness more strongly as the illuminance of the predicted projection surface is higher. The lower image 1130 of FIG. 11 shows an image corrected based on the predicted illuminance of the projection surface.

Figure 12A:
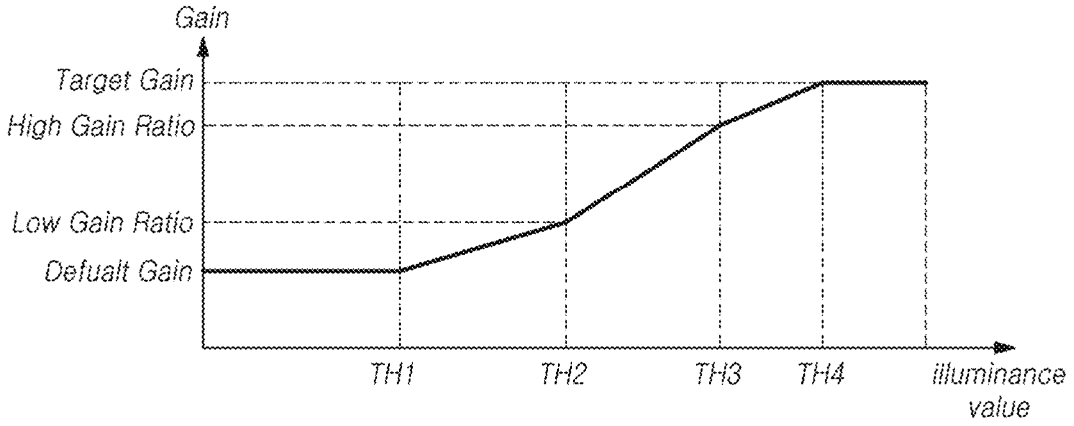
FIG. 12A is a graph illustrating setting an image quality correction intensity based on a predicted illuminance of a projection surface according to various embodiments.

FIG. 12A is graph illustrating example setting an intensity of image quality correction based on a predicted illuminance of the projection surface according to various embodiments.

In case where the projector 200 abruptly changes its image quality correction intensity in response to a screen transition or a change in illuminance, perceptible image flickering may occur.

Referring to FIG. 12A, the image flickering according to the change in illuminance may be improved or mitigated by differently setting the image quality correction intensity for each illuminance section (e.g., illuminance sections differentiated by TH1, TH2, TH3, and TH4), while gradually setting the image quality correction intensity according to the illuminance value.

The image quality correction intensity of the current frame may be set by reflecting the image quality correction intensity of at least one previous frame in a predetermined ratio, thereby improving the image flickering that may be caused by screen transitions. For example, the image quality correction intensity of the current frame may be set by reflecting 40% of the image quality correction intensity of the current frame, determined based on the predicted illumination of the projection surface, and reflecting 60% of the image quality correction intensity of the previous frame.

Figure 12B:
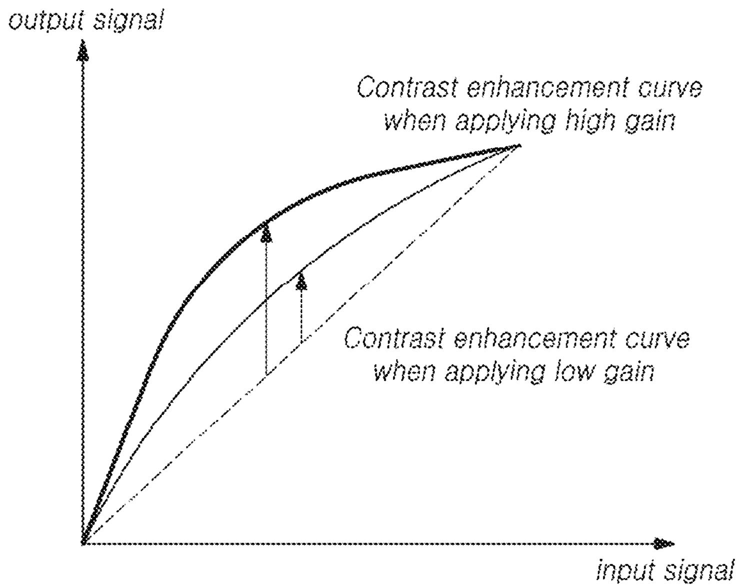
FIG. 12B is a graph illustrating applying an image quality correction intensity to contrast according to various embodiments.

FIG. 12B is a graph illustrating an example of applying an image quality correction intensity to contrast according to various embodiments.

Referring to FIG. 12B, it can be seen through the contrast enhancement curves that the contrast is further enhanced by applying a weak image quality correction intensity or a strong image quality correction intensity based on the illuminance predicted in a bright-room environment.

Figure 13:
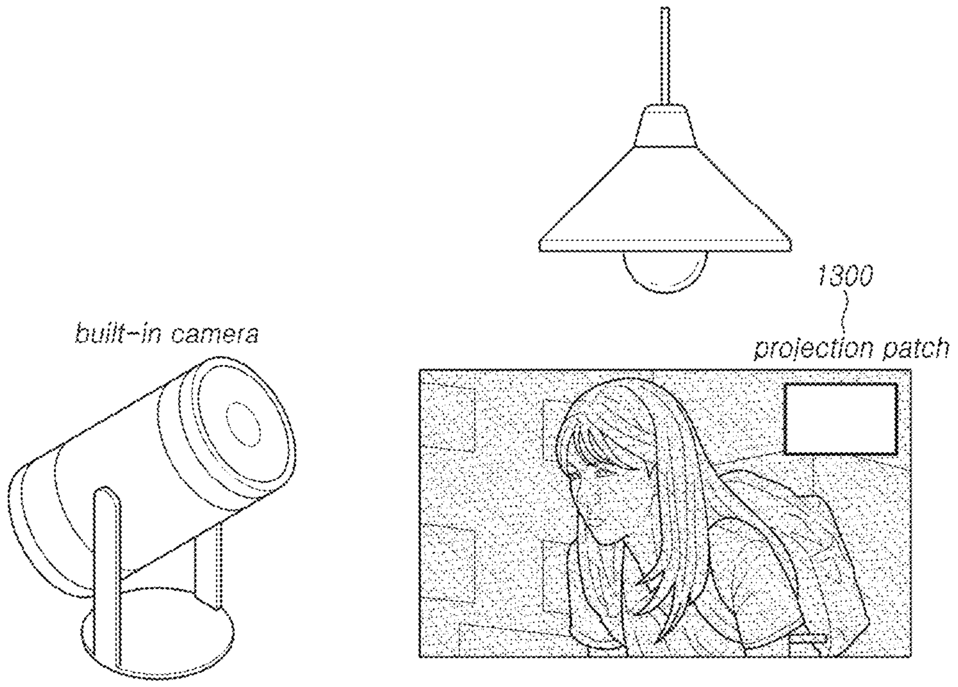
FIG. 13 is a diagram illustrating an example of predicting illuminance of a projection surface by projecting a predetermined patch onto the projection surface according to various embodiments.

FIG. 13 is a diagram illustrating an example of predicting an illuminance of a projection surface by projecting a predetermined patch onto the projection surface according to various embodiments.

Referring to FIG. 13, the projector 200 may project a predetermined patch (e.g., a gray pattern) onto a partial area (e.g., a center or corner area) of an image being projected and capture the image with a camera. The predetermined patch 1300 may be configured in advance with a pattern having a high effectiveness of a size that does not interfere with viewing. The predetermined patch 1300 may be configured to be distinguished for each frame. For example, the projector 200 may project ten patches in ten frames in steps and obtain a photographed image for each step.

According to an embodiment, the projector 200 may calculate an average picture level of the predetermined patch 1300 of the photographed image based on positional information of the predetermined patch 1300. The projector 200 may predict the illuminance of the projection surface by analyzing the relationship between an average picture level of the predetermined patch and an average picture level of the predetermined patch 1300 of the photographed image, using a learning model or a lookup table. The projector 200 may correct the image quality based on the predicted illuminance of the projection surface.

According to an embodiment, the projector 200 may more precisely predict the illuminance of the projection surface by projecting a predetermined patch with high effectiveness on a projected image, and more precisely correct the image quality based thereon.

Figure 14:
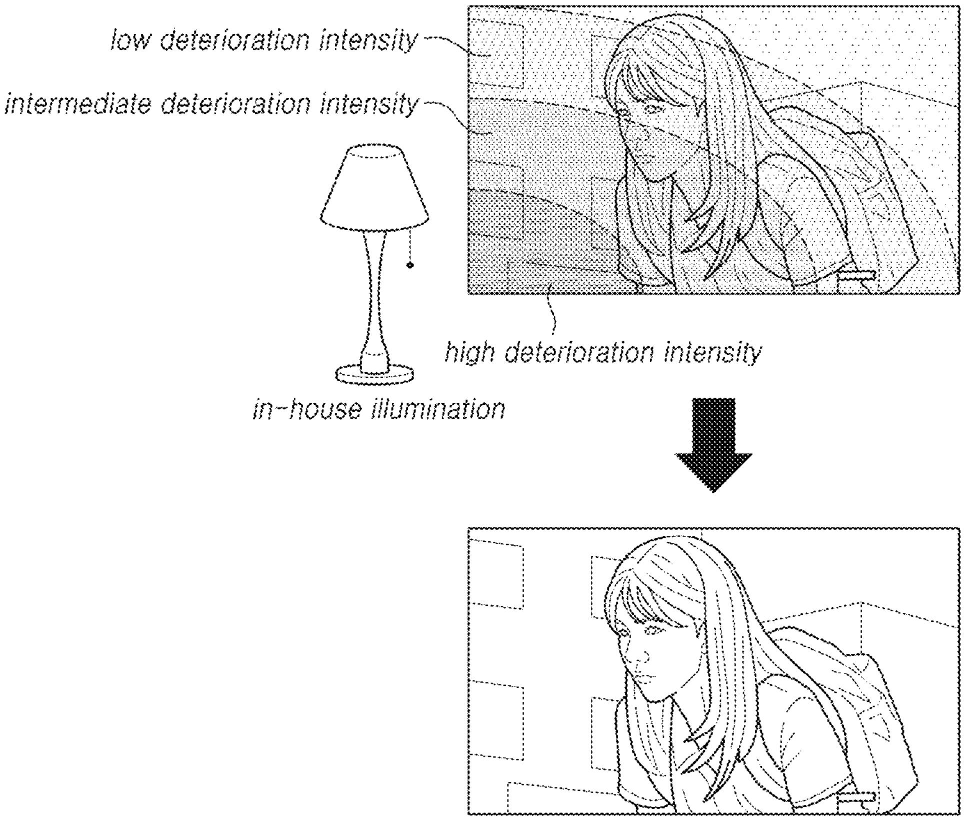
FIG. 14 is a diagram illustrating an example of illuminance prediction and image quality correction for each projection surface area according to various embodiments.

FIG. 14 is a diagram illustrating example illuminance prediction and image quality correction for each projection surface area according to various embodiments.

In case where the size of the projection surface is large, it may be difficult to consider one illuminance value as a representative value of the projection surface illumination. Referring to FIG. 14, the closer the distance to the illumination at home, the stronger the degree of image quality deterioration is, and the weaker the degree of image quality deterioration may be in the projection surface relatively far from the illumination. In such a case, if the image quality is corrected based on one predicted representative illuminance value, its effect of correction may be different for each projection area. Accordingly, predicting the illuminance for each area of the projection surface and correcting the image quality for each area based on the predicted illuminance value for each area allows for more precise and accurate correction of the image quality.

Figure 15:
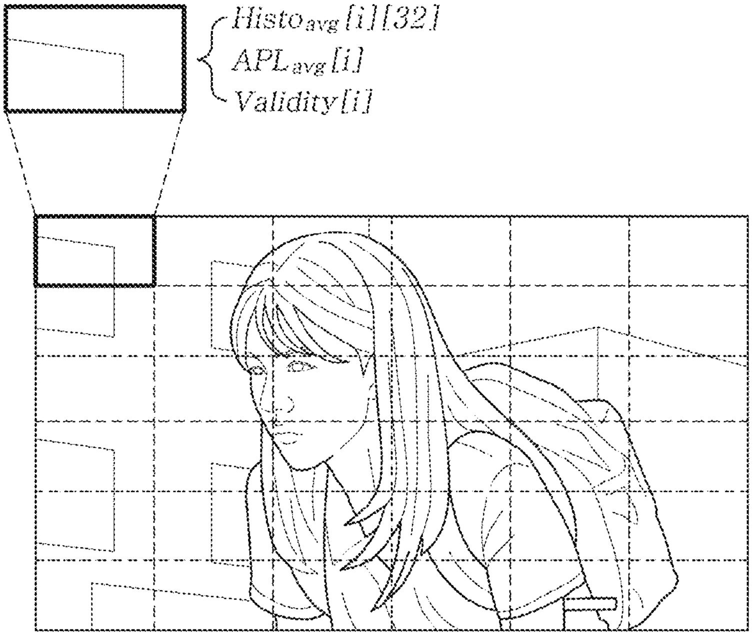
FIG. 15 is a diagram illustrating an example of calculating input image data for an I-th area of an input image in case where an input image is split into 36 areas, according to various embodiments.

FIG. 15 is a diagram illustrating an example of calculating input image data for an I-th area of an input image in case where the input image is divided into 36 areas, according to various embodiments.

Referring to FIG. 15, the projector 200 may divide each frame corresponding to an input image of a predetermined section into a predetermined number of areas (e.g., 36 areas). The projector 200 may divide the frame corresponding to the photographed image captured for the predetermined section into the predetermined number of areas. The projector 200 may calculate third input image data for each of the areas. The projector 200 may calculate third photographed image data for each of the areas. The third input image data may include a color histogram ($Histo_{in}$ [i]) and an average picture level ($APL_{in}$ [i]) corresponding to each frame area of the input image. The third photographed image data may include a color histogram ($Histo_{cam}$ [i]) and an average picture level ($APL_{cam}$ [i] corresponding to the frame area corresponding to the photographed image.

According to an embodiment, the projector 200 may determine validity for each area of the input image, based on the third input image data. Referring to FIG. 15, a validity value (Validity [i]) for determining validity of an input image may be obtained for an i-th area among the 36 image areas. The projector 200 may determine validity of an input image for the i-th area based on at least one of uniformity of a color histogram of the i-th area, uniformity of an average picture level, uniformity of variance of the color histogram, and the variance of the color histogram. The description of the mathematical equation for calculating the validity value is substantially the same as that described above with reference to the Equations 1 and 2.

According to an embodiment, the projector 200 may determine that the area of the input image is valid for predicting illuminance in case where the effectiveness value is greater than or equal to a predetermined value, or may determine that the area of the input image is not valid for predicting illuminance in case where the effectiveness value is less than the predetermined value.

Figure 16:
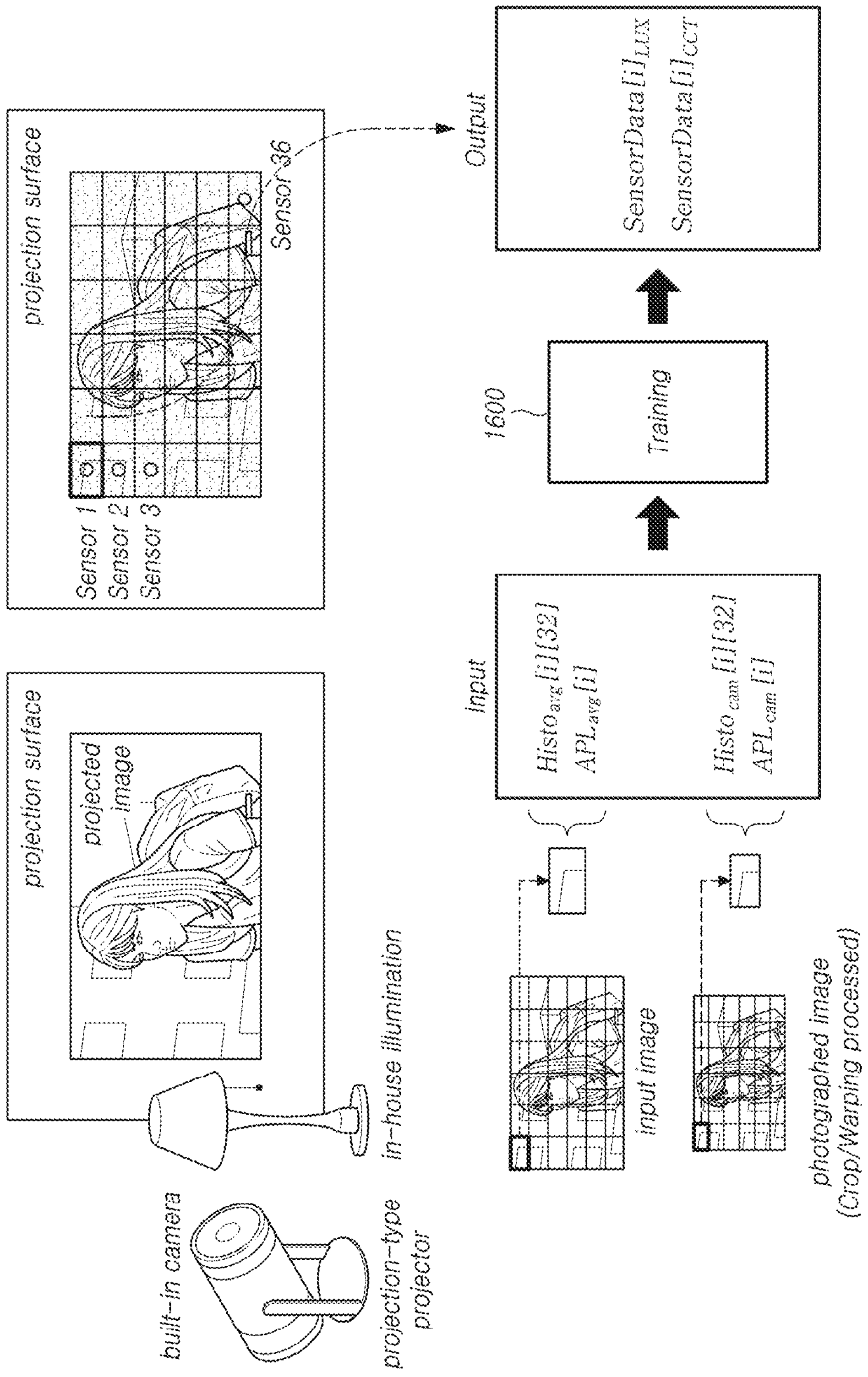
FIG. 16 is a diagram illustrating an example of predicting illuminance of a projection surface using a learning model for an I-th area of an input image in case where the input image is split into 36 areas, according to various embodiments.

FIG. 16 is a diagram illustrating an example of predicting illuminance of a projection surface using a learning model for an I-th area of an input image, in case where the input image is divided into 36 areas according to various embodiments.

According to an embodiment, if it is determined that the area of the input image is valid, the projector 200 may predict the illuminance of the projection surface area corresponding to the area using a learning model or a lookup table.

Referring to FIG. 16, if it is determined that the input image of the i-th area is valid, the projector 200 may input a pair of the third input image data and the third photographed image data, corresponding to the i-th area to the learning model 1600, and obtain an illuminance value of the i-th projection area as an output. The method of generating the learning model 1600 is the same as or similar to that described above with reference to FIG. 9.

Figure 17A:
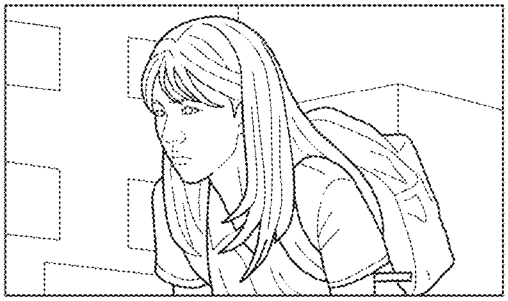
FIGS. 17A, 17B, and 17C are diagrams illustrating examples of an illuminance value map predicted for each area according to a result of determining validity for each area of an input image according to various embodiments.
Figure 17A:
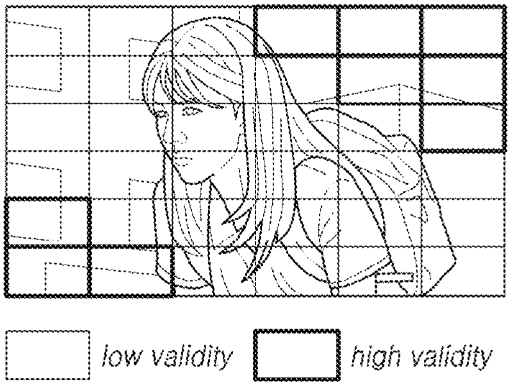
Figure 17A:
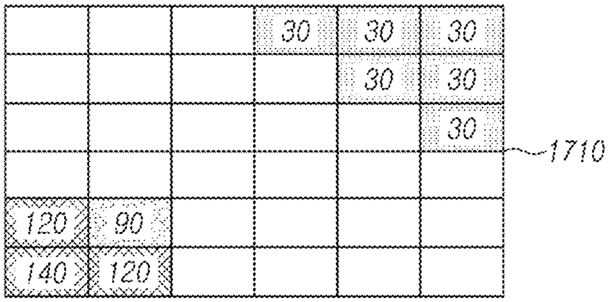
Figure 17B:
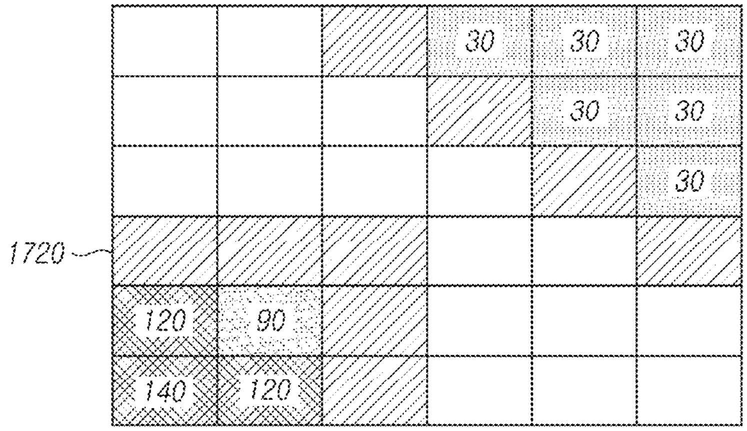
Figure 17C:
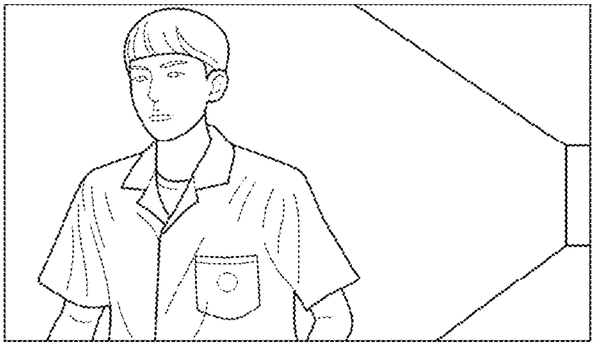
Figure 17C:
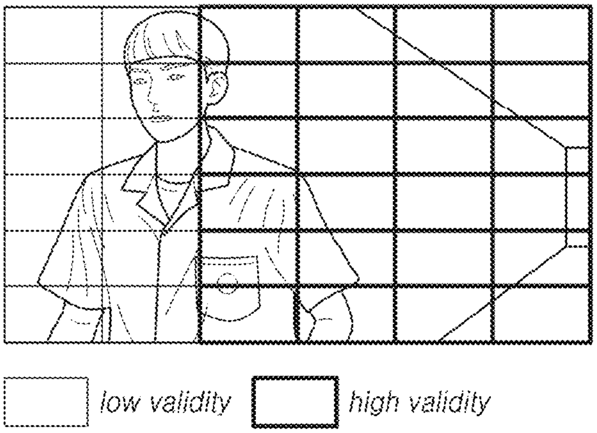
Figure 17C:
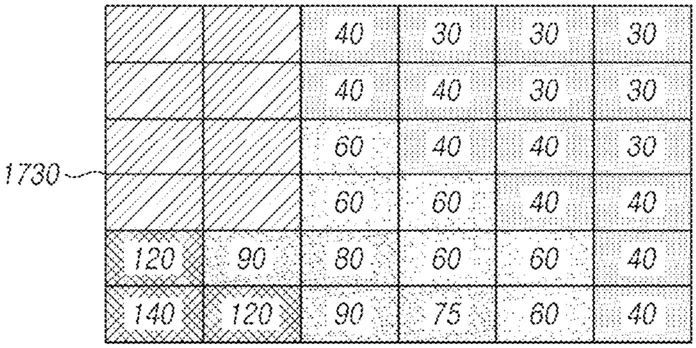

FIGS. 17A, 17B, and 17C are diagrams illustrating example illuminance value maps predicted for each area according to a result of determining validity for each area of an input image, according to various embodiments.

Referring to FIGS. 17A, 17B, and 17, the projector 200 may determine validity for each area of the input image, and generate or update an illuminance value map including an illuminance value predicted for each area.

Referring to FIG. 17A, when calculating the effectiveness value for each area in an input image example 1, in case where the validity value in a solid lined area is high and the validity value in a dotted lined area is low, the illuminance values corresponding to the solid lined area having high validity in the illuminance value map may be generated (1710).

According to an embodiment, the illuminance values corresponding to an area of low effectiveness may be generated by interpolation of surrounding illuminance values in the illuminance value map. The interpolation method may copy illuminance values of adjacent areas and apply an average value in case where there are a plurality of adjacent areas, but it will be understood by those skilled in the art that various interpolation schemes may be applied. Referring to FIG. 17B, illuminance values of the shaded area may be generated by interpolating surrounding illuminance values. For example, the surrounding illuminance values may include illuminance values of areas excluding themselves in a surrounding 3×3 area; however, it will be understood by those skilled in the art that the method of selecting the surrounding illuminance values is not limited thereto. For example, an area 1720 of row 4 and column 1 of the illuminance value map may have an illuminance value of 105 obtained by averaging the surrounding illuminance values. In this way, the number of times of interpolations may be repeated until all areas of the illuminance value map have the illuminance values.

Referring to FIG. 17C, in case where a new image (e.g., an input image example 2) is subsequently input, a validity value may be calculated for each area, and the illuminance values corresponding to solid line areas with high validity value may be updated in the illuminance value map. The illuminance values 1730 of the shaded area of FIG. 17C may be generated by interpolating the surrounding illuminance values. A method of interpolation using the surrounding illuminance values is the same as or similar to that described above with reference to FIG. 17B.

According to an embodiment, in case where the update of the illuminance value map is completed, the projector 200 may correct the image quality for each area based on the predicted illuminance of the projection surface area. The projector 200 may correct the image quality by adjusting at least one gain corresponding to the contrast, chroma, and sharpness of the corresponding input image area, based on the predicted illuminance of the projection surface area. In case where the intensity is different for each area, a step may occur between the areas. Accordingly, the projector 200 may calculate and apply the image quality correction intensity of the specific area as a weighted mean of the image quality correction intensities of adjacent areas, but the disclosure is not limited thereto. In calculating the weighted mean, the intensity may be weighted and averaged for each pixel in the area in inverse proportion to the distance from the center of the adjacent area, such that the image quality correction intensity of the closer area is applied more strongly applied, but the disclosure is not limited thereto.

Figure 18:
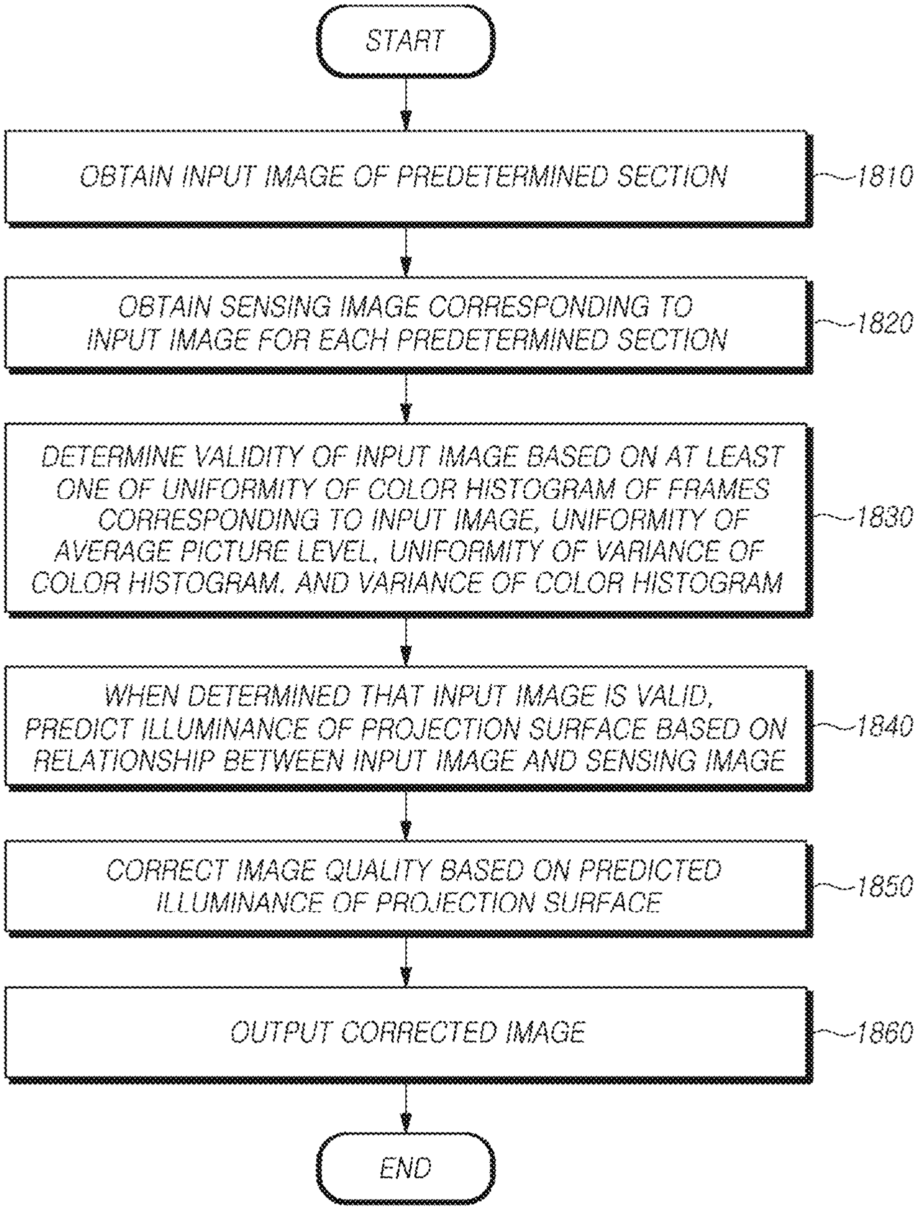
FIG. 18 is a flowchart illustrating an example method for correcting image quality based on predicted illuminance of a projection surface according to various embodiments.

FIG. 18 is a flowchart illustrating an example method for correcting image quality based on predicted illuminance of a projection surface, according to various embodiments. The projector of FIG. 18 may be an electronic device corresponding to the projector 200 of FIG. 2 and the projector 300 of FIG. 3. In description of operations of the projector described in FIG. 18, a portion that overlaps the corresponding portion described in FIGS. 2 and 3 may not be repeated here. Some of the operations illustrated in FIG. 18 may be omitted, and operations not illustrated in FIG. 18 may be added.

In operation 1810 according to an embodiment, the projectors 200 and 300 may obtain an input image of a predetermined (e.g., specified) section.

In operation 1820 according to an embodiment, the projectors 200 and 300 may obtain a sensing image corresponding to the input image for the respective predetermined section. The projectors 200 and 300 may crop the image area from the sensing image. The projectors 200 and 300 may warp the cropped sensing image based on an aspect ratio of the input image.

According to an embodiment, the projectors 200 and 300 may calculate input image data based on the input image. The input image data may include a color histogram and an average picture level of each of frames corresponding to the input image in the predetermined section.

According to an embodiment, the projectors 200 and 300 may calculate sensing image data based on the sensing image. The projectors 200 and 300 may calculate the sensing image data based on the warped sensing image. The sensing image data may include a color histogram and an average picture level of a frame corresponding to the sensing image or the warped sensing image.

According to an embodiment, the projectors 200 and 300 may determine validity of the input image based on the input image data. In operation 1830 according to an embodiment, the projectors 200 and 300 may determine validity of the input image, based on at least one of uniformity of a color histogram of frames, uniformity of an average picture level thereof, uniformity of variance of the color histogram, and the variance of the color histogram, respectively corresponding to the input image.

In operation 1840 according to an embodiment, if it is determined that the input image is valid, the projectors 200 and 300 may predict the illuminance of the projection surface based on the relationship between the input image and the sensing image. If it is determined that the input image is valid, the projectors 200 and 300 may predict the illuminance of the projection surface by analyzing the relationship between the input image data and the sensing image data using a learning model or a lookup table. The projectors 200 and 300 may generate the learning model by performing artificial intelligence learning on the relationship between the pair of the input image data and the sensing image data and the projection surface illuminance. The projectors 200 and 300 may generate the relationship between the pair of the input image data and the sensing image data and the projection surface illuminance as the lookup table.

According to an embodiment, if it is determined that the input image is not valid, the projectors 200 and 300 may obtain a second input image of a second predetermined section. The projectors 200 and 300 may obtain a second sensed image corresponding to the second input image for every second predetermined section. The projectors 200 and 300 may calculate second input image data based on the second sensed image. The projectors 200 and 300 may calculate second sensing image data based on the second sensing image. The projectors 200 and 300 may determine validity of the second input image based on the second input image data. For example, the projectors 200 and 300 may determine validity of the input image again based on the input image obtained in a new section.

In operation 1850 according to an embodiment, the projectors 200 and 300 may correct image quality based on the predicted illuminance of the projection surface.

According to an embodiment, after correcting the image quality, the projectors 200 and 300 may increase the predetermined section by a predetermined value. The processor 210 may maintain the increased predetermined section until the illuminance of the predicted projection surface is not changed.

According to an embodiment, the projectors 200 and 300 may predict illuminance for each area of the projection surface and correct the image quality for each area. To this end, the projectors 200 and 300 may divide each frame corresponding to the input image of the predetermined section into a predetermined number of areas. The projectors 200 and 300 may divide a frame corresponding to the sensing image sensed for each predetermined section into the predetermined number of areas. The projectors 200 and 300 may calculate third input image data and third sensing image data for each area. The projectors 200 and 300 may determine validity for each area of the input image based on the third input image data. If it is determined that the area of the input image is valid, the projectors 200 and 300 may predict the illuminance of the projection surface area corresponding to the area, utilizing the learning model or the lookup table. The projectors 200 and 300 may correct the image quality for each area based on the predicted illuminance of the projection surface area.

In operation 1860 according to an embodiment, the projectors 200 and 300 may output the corrected image.

According to an example embodiment of the disclosure, a projector may include: an input/output interface comprising various circuitry configured to input and output an image, a projection unit comprising a light source and configured to project the image onto a projection surface, a sensor configured to sense the image projected onto the projection surface, memory storing at least one instruction, and at least one processor, comprising processing circuitry, electrically connected to the input/output interface, the projection unit, the sensor, and the memory, wherein at least one processor, individually and/or collectively, is configured to execute the at least one instruction, and to cause the projector to: obtain an input image of a specified section from the input/output interface; obtain a sensing image corresponding to the input image for each specified section from the sensor; determine validity of the input image based on at least one of uniformity of color histograms of frames, uniformity of an average picture level, uniformity of variance of the color histograms, and the variance of the color histograms, respectively corresponding to the input image; and based on determining that the input image is valid, predict illuminance of a projection surface based on a relationship between the input image and the sensing image, correct image quality of the input image based on the predicted illuminance of the projection surface, and output the corrected image through the input/output interface.

According to an example embodiment, at least one processor, individually and/or collectively, may be configured to cause the projector to: calculate input image data based on the input image, and calculate sensing image data based on the sensing image, wherein the input image data may comprise a color histogram and an average picture level (APL) of each of frames corresponding to the input image of the specified section, and wherein the sensing image data may comprise a color histogram and an average picture level of a frame corresponding to the sensing image sensed for each specified section.

According to an example embodiment, at least one processor, individually and/or collectively, may be configured to cause the projector to: based on determining that the input image is not valid, obtain a second input image of a second specified section from the input/output interface, obtain a second sensing image corresponding to the second input image for each specified section from the sensor, calculate second input image data based on the second input image, calculate second sensing image data based on the second sensing image, and determine validity of the second input image based on the second input image data.

According to an example embodiment, at least one processor, individually and/or collectively, may be configured to cause the projector to: increase the specified section by a specified value, and maintain the increased specified section until the predicted illuminance of the projection surface is not changed.

According to an example embodiment, at least one processor, individually and/or collectively, may be configured to cause the projector to: crop an image area from the sensing image, warp the cropped sensing image based on an aspect ratio of the input image, and calculate the sensing image data based on the warped sensing image.

According to an example embodiment, at least one processor, individually and/or collectively, may be configured to: generate a learning model by performing artificial intelligence learning on a relationship between a pair of the input image data and the sensing image data and illuminance of the projection surface, and predict the illuminance of the projection surface by analyzing the relationship between the input image data and the sensing image data using the learning model.

According to an example embodiment, at least one processor, individually and/or collectively, may be configured to cause the projector to: generate a relationship between the pair of the input image data and the sensing image data and the illuminance of the projection surface as a lookup table, and analyze the relationship between the input image data and the sensing image data using the lookup table to predict the illuminance of the projection surface.

According to an example embodiment, at least one processor, individually and/or collectively, may be configured to cause the projector to: divide each of frames corresponding to the input image into a specified number of areas, divide a frame corresponding to the sensing image into the specified number of areas, calculate third input image data for each area, calculate third sensing image data for each area, determine validity for each area of the input image based on the third input image data, based on determining that the area of the input image is valid, predict illuminance of a projection surface area corresponding to the area using a learning model or a lookup table, and correct the image quality for each area based on the predicted illuminance of the projection surface area.

According to an example embodiment of the disclosure, a method for correcting image quality based on predicted illuminance of a projection surface may comprise: obtaining an input image of a specified section; obtaining a sensing image corresponding to the input image for each specified section; determining validity of the input image based on at least one of uniformity of color histograms of frames, uniformity of an average picture level, uniformity of variance of the color histograms, and the variance of the color histograms, respectively corresponding to the input image; based on determining that the input image is valid, predicting illuminance of a projection surface based on a relationship between the input image and the sensing image; and correcting image quality of the input image based on the predicted illuminance of the projection surface.

According to an example embodiment, the method may further comprise: calculating input image data based on the input image, and calculating sensing image data based on the sensing image. The input image data may comprise a color histogram and an average picture level (APL) of each of frames corresponding to the input image of the specified section. The sensing image data may comprise a color histogram and an average picture level of a frame corresponding to the sensing image sensed for each specified section.

According to an example embodiment, the method may further comprise, based on determining that the input image is not valid: obtaining a second input image of a second specified section; obtaining a second sensing image corresponding to the second input image for each specified section; calculating second input image data based on the second input image; calculating second sensing image data based on the second sensing image; and determining validity of the second input image based on the second input image data.

According to an example embodiment, the method may further comprise increasing the specified section by a specified value, and maintaining the increased specified section until the predicted illuminance of the projection surface is not changed.

According to an example embodiment, the method may further comprise: cropping an image area from the sensing image, warping the cropped sensing image based on an aspect ratio of the input image, and calculating the sensing image data based on the warped sensing image.

According to an example embodiment, the method may further comprise: generating a learning model by performing artificial intelligence learning on a relationship between a pair of the input image data and the sensing image data and illuminance of the projection surface. The operation of predicting the illuminance of the projection surface based on a relationship between the input image and the sensing image may include predicting the illuminance of the projection surface by analyzing the relationship between the input image data and the sensing image data using the learning model.

According to an example embodiment, the method may further comprise: generating a relationship between the pair of the input image data and the sensing image data and the illuminance of the projection surface as a lookup table. The operation of predicting the illuminance of the projection surface based on a relationship between the input image and the sensing image may include predicting the illuminance of the projection surface by analyzing the relationship between the input image data and the sensing image data using the lookup table.

According to an example embodiment, the method may further comprise: dividing each of frames corresponding to the input image into a specified number of areas; dividing a frame corresponding to the sensing image into the specified number of areas; calculating third input image data for each area; calculating third sensing image data for each area; determining validity for each area of the input image based on the third input image data; based on determining that the area of the input image is valid, predicting illuminance of a projection surface area corresponding to the area using a learning model or a lookup table; and correcting the image quality for each area based on the predicted illuminance of the projection surface area.

According to an example embodiment of the disclosure, a non-transitory computer-readable recording medium in which a program for performing the method is recorded may be included.

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. For example, a component expressed in the singular is to be understood as including a plurality of components unless the context clearly indicates only a singular meaning. As used in the disclosure, the term "and/or" is to be understood to encompass all possible combinations of one or more of the enumerated items. As used in the disclosure, the terms "comprise", "have", "include", "consist of", and the like are intended only to designate the presence of features, components, parts, or combinations thereof described in the disclosure, and the use of such terms is not intended to exclude the possibility of presence or addition of one or more other features, components, parts, or combinations thereof. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st", "2nd", or "first" or "second" may be used to simply distinguish a corresponding component from another, and does not limit the components in other aspect (e.g., importance or order).

As used in connection with various embodiments of the disclosure, the term "~ portion" or "~ module" may include a unit implemented in hardware, software, or firmware, or any combination thereof, and may interchangeably be used with other terms, for example, "logic", "logic block", "part", or "circuit". Such a "~ portion" or "~ module" may be a single integral component, or a minimum unit or a part of the component, adapted to perform one or more functions. For example, according to an embodiment, the "~ portion" or "~ module" may be implemented in the form of an application-specific integrated circuit (ASIC).

As used in connection with various embodiments of the disclosure, the term "in case where (or that)~" may be interpreted to refer, for example, to "when ~", "if ~", "in response to determining ~", or "in response to detecting ~", depending on the context. Similarly, the phrases "when it is determined that ~" or "when it is detected that ~" may be interpreted to refer, for example, to "when determining ~", "in response to determining ~", "when detecting ~" or "in response to detecting ~", depending on the context.

The program executed by the projector 200 as described in the disclosure may be implemented as a hardware component, a software component, and/or a combination of the hardware component and the software component. The program may be performed by any system capable of executing computer-readable instructions.

Software may include a computer program, a code, an instruction, or a combination of one or more of them, and may configure a processing unit to operate as desired or instruct the processing unit independently or collectively. The software may be implemented as a computer program including instructions stored in a computer-readable storage medium. The computer-readable storage media may include, for example, magnetic storage media (e.g., read-only memory (ROM), random-access memory (RAM), a floppy disk, hard disk, etc.), optical readable media (e.g., compact disc read only memory (CD-ROM), DVD) and the like. The computer-readable storage media may be distributed over networked computer systems, so that computer-readable codes may be stored and executed in a distributed manner. The computer program product may be distributed (e.g., downloaded or uploaded) directly or online through an application store (e.g., PlayStore™) or between two user devices (e.g., smartphones). If distributed online, at least part of the computer program product may be at least temporarily stored or generated in a machine-readable storage medium, such as memories of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more components or operations of the above-described components may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, alternatives and/or variations of the various example embodiments may be made without departing from the true technical spirit and full technical scope of the disclosure, including the appended claims and their equivalents. It will also be understood that any of the embodiment(s) described herein may be used in conjunction with any other embodiment(s) described herein.

What is claimed is:

1. A projector comprising:

an input/output interface comprising circuitry configured to input and output an image;

a projection unit comprising a lamp and/or lens and configured to project the image onto a projection surface;

a sensor configured to sense the image projected onto the projection surface;

memory storing at least one instruction; and at least one processor, comprising processing circuitry, electrically connected to the input/output interface, the projection unit, the sensor, and the memory, and individually and/or collectively, configured to execute the at least one instruction and to cause the projector to:

obtain an input image of a specified section from the input/output interface;

obtain a sensing image corresponding to the input image for each specified section from the sensor;

determine validity of the input image based on at least one of uniformity of color histograms of frames, uniformity of an average picture level, uniformity of variance of the color histograms, and the variance of the color histograms, respectively corresponding to the input image;

based on determining that the input image is valid, predict illuminance of the projection surface based on a relationship between the input image and the sensing image;

correct image quality of the input image based on the predicted illuminance of the projection surface; and output the corrected image through the input/output interface.

2. The projector of claim 1, wherein at least one processor, individually and/or collectively, is configured to cause the projector to:

calculate input image data based on the input image; and calculate sensing image data based on the sensing image, wherein the input image data comprises a color histogram and an average picture level (APL) of each of frames corresponding to the input image of the specified section, and wherein the sensing image data comprises a color histogram and an average picture level of a frame corresponding to the sensing image sensed for each specified section.

3. The projector of claim 1, wherein at least one processor, individually and/or collectively, is configured to cause the projector to:

based on determining that the input image is not valid, obtain a second input image of a second specified section from the input/output interface;

obtains a second sensing image corresponding to the second input image for each second specified section from the sensor;

calculate second input image data based on the second input image;

calculate second sensing image data based on the second sensing image; and determine validity of the second input image based on the second input image data.

4. The projector of claim 1, wherein at least one processor, individually and/or collectively, is configured to cause the projector to:

increase the specified section by a specified value; and maintain the increased specified section until the predicted illuminance of the projection surface is not changed.

5. The projector of claim 2, wherein at least one processor, individually and/or collectively, is configured to cause the projector to:

crop an image area from the sensing image;

warp the cropped sensing image based on an aspect ratio of the input image; and calculate the sensing image data based on the warped sensing image.

6. The projector of claim 2, wherein at least one processor, individually and/or collectively, is configured to cause the projector to:

generate a learning model by performing artificial intelligence learning on a relationship between a pair of the input image data and the sensing image data and illuminance of the projection surface; and predict the illuminance of the projection surface by analyzing the relationship between the input image data and the sensing image data using the learning model.

7. The projector of claim 2, wherein at least one processor, individually and/or collectively, is configured to cause the projector to:

generate a relationship between a pair of the input image data and the sensing image data and the illuminance of the projection surface as a lookup table; and analyze the relationship between the input image data and the sensing image data using the lookup table, and predict the illuminance of the projection surface.

8. The projector of claim 1, wherein at least one processor, individually and/or collectively, is configured to cause the projector to:

divide each of frames corresponding to the input image into a specified number of areas;

divide a frame corresponding to the sensing image into the specified number of areas;

calculate third input image data for each area;

calculate third sensing image data for each area;

determine validity for each area of the input image based on the third input image data;

based on determining that the area of the input image is valid, predict illuminance of a projection surface area corresponding to the area using a learning model and/or a lookup table; and correct the image quality for each area based on the predicted illuminance of the projection surface area.

9. A method comprising:

obtaining an input image of a specified section;

obtaining a sensing image corresponding to the input image for each specified section;

determining validity of the input image based on at least one of uniformity of color histograms of frames, uniformity of an average picture level, uniformity of variance of the color histograms, and the variance of the color histograms, respectively corresponding to the input image;

based on determining that the input image is valid, predicting illuminance of a projection surface based on a relationship between the input image and the sensing image;

correcting image quality of the input image based on the predicted illuminance of the projection surface; and outputting the corrected image.

10. The method of claim 9, further comprising:

calculating input image data based on the input image; and calculating sensing image data based on the sensing image, wherein the input image data comprises a color histogram and an average picture level (APL) of each of frames corresponding to the input image of the specified section, and wherein the sensing image data comprises a color histogram and an average picture level of a frame corresponding to the sensing image sensed for each specified section.

11. The method of claim 9, further comprising, based on determining that the input image is not valid:

obtaining a second input image of a second specified section;

obtaining a second sensing image corresponding to the second input image for each second specified section;

calculating second input image data based on the second input image;

calculating second sensing image data based on the second sensing image; and determining validity of the second input image based on the second input image data.

12. The method of claim 9, further comprising:

increasing the specified section by a specified value, and maintaining the increased specified section until the predicted illuminance of the projection surface is not changed.

13. The method of claim 10, further comprising:
cropping an image area from the sensing image;
warping the cropped sensing image based on an aspect ratio of the input image; and
calculating the sensing image data based on the warped sensing image.

14. The method of claim 10, further comprising: generating a learning model by performing artificial intelligence learning on a relationship between a pair of the input image data and the sensing image data and illuminance of the projection surface,
wherein predicting the illuminance of the projection surface based on the relationship between the input image and the sensing image includes predicting the illuminance of the projection surface by analyzing the relationship between the input image data and the sensing image data using the learning model.

15. The method of claim 10, further comprising: generating a relationship between a pair of the input image data and the sensing image data and the illuminance of the projection surface as a lookup table,
wherein predicting the illuminance of the projection surface based on the relationship between the input image and the sensing image includes predicting the illuminance of the projection surface by analyzing the relationship between the input image data and the sensing image data using the lookup table.

16. The method of claim 9, further comprising:
dividing each of frames corresponding to the input image into a specified number of areas;
dividing a frame corresponding to the sensing image into the specified number of areas;
calculating third input image data for each area;
calculating third sensing image data for each area;
determining validity for each area of the input image based on the third input image data;
based on determining that the area of the input image is valid, predicting illuminance of a projection surface area corresponding to the area using a learning model and/or a lookup table; and
correcting the image quality for each area based on the predicted illuminance of the projection surface area.

* * * * *